(12) United States Patent
Belanger et al.

(10) Patent No.: US 10,981,547 B2
(45) Date of Patent: Apr. 20, 2021

(54) VEHICLE WASH SYSTEM HAVING A VERTICALLY OPERATED TOP BRUSH WITH PIVOTING ABILITY

(71) Applicant: WashMe Properties, LLC, Northville, MI (US)

(72) Inventors: Michael J. Belanger, Northville, MI (US); Barry S. Turner, Novi, MI (US); David L. Tognetti, Howell, MI (US); Curtis S. Prater, Warren, MI (US)

(73) Assignee: Belanger, Inc., Northville, MI (US)

( * ) Notice: Subject to any disclaimer, the term of this patent is extended or adjusted under 35 U.S.C. 154(b) by 0 days.

(21) Appl. No.: 16/213,675

(22) Filed: Dec. 7, 2018

(65) Prior Publication Data

US 2019/0176777 A1 Jun. 13, 2019

Related U.S. Application Data

(60) Provisional application No. 62/596,005, filed on Dec. 7, 2017.

(51) Int. Cl.

| | |
|---|---|
| *B60S 3/06* | (2006.01) |
| *B08B 1/02* | (2006.01) |
| *B08B 1/00* | (2006.01) |
| *A46B 7/10* | (2006.01) |
| *A46B 13/00* | (2006.01) |
| *A46B 13/02* | (2006.01) |
| *B66F 7/06* | (2006.01) |
| *A46B 15/00* | (2006.01) |
| *B60S 3/04* | (2006.01) |

(Continued)

(52) U.S. Cl.
CPC ............ *B60S 3/066* (2013.01); *A46B 7/10* (2013.01); *A46B 13/005* (2013.01); *A46B 13/02* (2013.01); *A46B 15/0004* (2013.01); *B08B 1/002* (2013.01); *B08B 1/02* (2013.01); *B60S 3/042* (2013.01); *B60S 3/06* (2013.01); *B60S 3/063* (2013.01); *B66F 7/0666* (2013.01); *A46B 2200/3046* (2013.01); *B08B 1/04* (2013.01); *B60S 1/00* (2013.01); *B60S 3/002* (2013.01); *B60S 3/004* (2013.01); *B64F 5/30* (2017.01); *H02K 9/28* (2013.01)

(58) Field of Classification Search
CPC ..... B60S 3/06; B60S 3/066; A46B 2200/3046
See application file for complete search history.

(56) References Cited

U.S. PATENT DOCUMENTS 2,610,342 A * 9/1952 Griffiths .................. B60S 3/066
15/53.3
3,304,565 A * 2/1967 Fuhring .................... B60S 3/06
15/53.2

FOREIGN PATENT DOCUMENTS

GB 1 314 840 * 4/1973

* cited by examiner

*Primary Examiner* — Randall E Chin
(74) *Attorney, Agent, or Firm* — Dickinson Wright PLLC

(57) ABSTRACT

A vehicle wash system includes a frame suspended above a vehicle treatment area. A pivotable frame is pivotally coupled to the frame, and an extendable and retractable linear frame is coupled to the pivotable frame and configured to extend downward from the pivotable frame and retract upward toward the pivotable frame. A top brush is coupled to a lower end of the linearly frame, and is extendable toward engagement with a vehicle. The top brush is also pivotable relative to a vertical position via pivoting of the pivotable frame, and the top brush is pivotable at different degrees of extension of the linear frame. The linear frame and the top brush may pivot in response to contact from the vehicle.

20 Claims, 24 Drawing Sheets

(51) Int. Cl.
*B08B 1/04* (2006.01)
*B64F 5/30* (2017.01)
*B60S 1/00* (2006.01)
*B60S 3/00* (2006.01)
*H02K 9/28* (2006.01)

VEHICLE WASH SYSTEM HAVING A VERTICALLY OPERATED TOP BRUSH WITH PIVOTING ABILITY

CROSS-REFERENCE TO RELATED APPLICATIONS

This application claims the benefit of previously filed U.S. Provisional Patent Application No. 62/596,005, filed Dec. 7, 2017, titled "An Improved Rollover Vehicle Wash System," the entire contents of which is hereby incorporated by reference in its entirety.

This application is related to co-filed U.S. patent applications, filed Dec. 7, 2018, with reference made to the TITLE and U.S. Application No., including: VEHICLE WASH SYSTEM HAVING A VERTICALLY OPERATED TOP BRUSH WITH COLLAPSIBLE GUIDE TRACK SYSTEM, U.S. Application No. 16/213,605 filed Dec. 7, 2018; VEHICLE WASH SYSTEM WITH SIDE BRUSHES HAVING TWO OR MORE AXIAL ORIENTATIONS, U.S. Application No. 16/213,968 filed Dec. 7, 2018; VEHICLE WASH SYSTEM WITH SIDE BRUSHES HAVING THREE OR MORE AXIAL ORIENTATIONS, U.S. Application No. 16/213,974 filed Dec. 7, 2018; VEHICLE WASH SYSTEM HAVING A VERTICALLY OPERATED TOP BRUSH WITH A SCISSOR SUPPORT MECHANISM, U.S. Application No. 16/213,733, filed Dec. 7,2018; VEHICLE WASH SYSTEM WITH PIVOTING SIDE BRUSHES AND METHOD FOR AVOIDING VEHICLE ANTENNA, U.S. Application No. 16/213,983, filed Dec. 7,2018; VEHICLE WASH SYSTEM WITH PIVOTING SIDE BRUSHES AND METHOD FOR AVOIDING VEHICLE SIDE MIRRORS, U.S. Application No. 16/213,994, filed Dec. 7, 2018; VEHICLE WASH SYSTEM HAVING A MULTI-SPEED CAR WASH BRUSH, U.S. Application No. 16/214,005 filed Dec. 7, 2018, and the entire contents of each of the above listed co-filed applications is hereby incorporated by reference in its entirety.

TECHNICAL FIELD

The present disclosure relates generally to a vehicle wash system for cleaning an exterior surface of a vehicle. More specifically, the present disclosure relates to a vehicle wash system having a vertically operated top brush with pivoting ability.

BACKGROUND

Vehicle wash systems are in common use to clean passenger vehicles such as automobiles. These vehicle wash systems may include a number of washing components that can be used to clean different sections of the vehicle. For example, wash systems may include a top brush that cleans the top surfaces of the vehicle and side brushes that clean the side surfaces of the vehicle. The top brush is typically raised and lowered relative to the vehicle to clean the varying heights inherent in the top surfaces of vehicles. The top brush may also be moved fore-and-aft to travel along the length of the vehicle, or the vehicle may be conveyed past the top brush to cover the length of the vehicle. The side brushes, similar to the top brush, may be translated fore-and-aft relative to the vehicle to cover the length of the vehicle, either by translating the brush relative to stationary vehicle, or conveying the vehicle past stationary brushes.

To adjust the height of the top brush with respect to a vehicle treatment area, the brush may be carried on a vertical rail system, with the brush extending horizontally between opposing rails. The rails are disposed on opposite sides of the vehicle, and the brush extends across the width of the vehicle between the rails. During vertical movement of the top brush, the brush will become in the path of the vehicle, either in front of or behind a portion of the vehicle. Accordingly, substantial damage to the brush and rails can occur in the event that the vehicle moves when the top brush is in a lowered position and in the path of the vehicle. Similarly, because the top brush is moved relative to the vehicle, either by translating the brush or conveying the vehicle, the top brush may collide with the vehicle in the event the vertical movement of the top brush is not controlled properly relative to the for-and-aft movement relative to the vehicle. Again such contact with the brush can cause significant damage to the top brush and/or rail system necessitating repair thereof and also causing significant down time of the wash system. Additionally, the rails of these prior systems are fixed and do not retract as the top brush retracts from the path of a vehicle. As such, they are susceptible to unwanted vehicle contact and thus damage. Moreover, because these top brush systems remain in a single vertical plain, they require an advanced control system, such as including torque sensors and feedback, to follow the contour of the car as the brush moves relative to the car.

Another solution to cleaning the top of the vehicle includes the use of a pivoting top brush with a fixed vertical position. The pivoting top brush may be simpler than the vertical top brush described above. The pivoting top brush may be used without an advanced control system having torque sensing capabilities. The top brush may be arranged to make contact with a lower portion of the vehicle body, and as the top brush is translated rearwardly, the brush may pivot relative to an upper pivot connection to allow the brush to travel along an upper surface of the vehicle. Because the top brush remains in a fixed position, it does not require a rail system to effect vertical movement thereof. Accordingly, the potential for system and/or vehicle damage from collisions between the brush and the vehicle is reduced. The pivoting system may be used for both rollover type systems and conveyor type systems. However, in both cases, the back surface of the vehicle may not be properly cleaned.

In view of the above, there is a need for an improved vehicle wash system.

SUMMARY OF THE DISCLOSURE

It is therefore an aspect of the present disclosure to provide a vehicle wash system that minimizes damages to the system as well as vehicles that enter the wash.

It is another aspect of the present disclosure to provide a vehicle wash system that provides improved cleaning capabilities.

According to the above and the other aspects, a vehicle washing system is provided. The vehicle wash system includes a frame disposed above a vehicle treatment area and configured for supporting at least one vehicle treatment component. The frame has a first brush coupled thereto, wherein the first brush is rotatable about a central axis which axis is oriented generally parallel to the vehicle treatment area. The first brush is in communication with a vertical translation mechanism, wherein the vertical translation mechanism permits movement of the first brush in a vertical direction relative to the vehicle treatment area for contacting at least an upper surface of vehicle disposed therein. The first brush is coupled to a pivot mechanism which permits pivoting movement of the brush about a pivot point in a direction toward and away from a vehicle entrance portion.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE DISCLOSURE

The present disclosure relates to a vehicle wash system, which may be configured as a rollover type system where the vehicle remains stationary and the various treatment components may be translated and/or moved with respect to the vehicle to perform the vehicle wash process. As is known to one of ordinary skill in the art, a rollover wash system carries various components that treat a vehicle in a predetermined sequence as the rollover wash system makes passes over the length of a vehicle. It will be appreciated that various aspects, components, or portions of the disclosed vehicle wash system may be utilized or employed as part of a conveyor wash system where a vehicle is conveyed past stationary wash components to treat the vehicle exterior as it travels through the wash facility. It will be appreciated that the various aspects, components, or portions of the disclosed vehicle wash system may be employed in connection with a variety of other applications outside of a rollover or conveyor vehicle wash system, such as a manual wash or self-service wash process.

Figure 1:
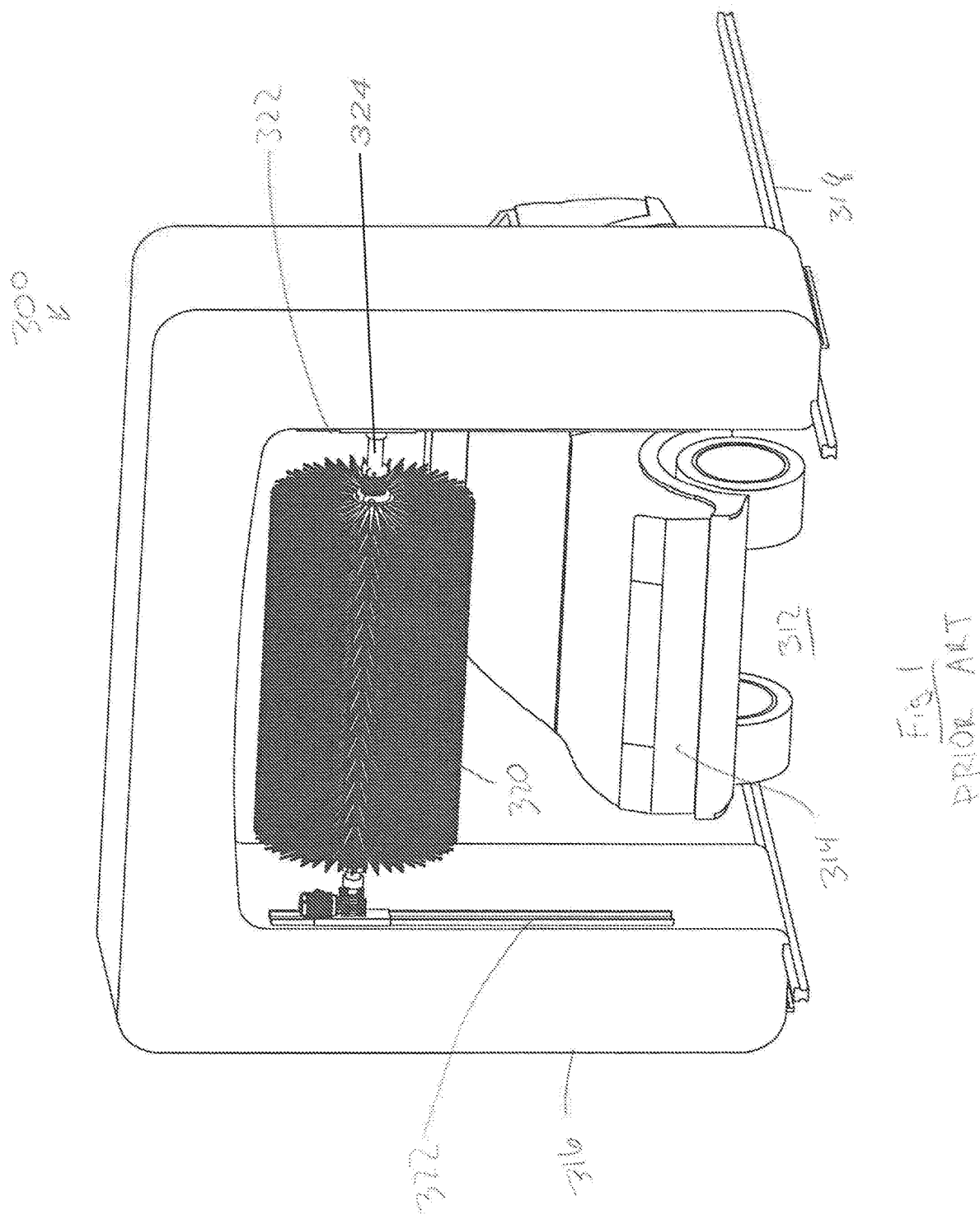
FIG. 1 illustrates a prior art wash system with a top brush that is moveable along vertically mounted rails with the top brush in an upper position.
Figure 2:
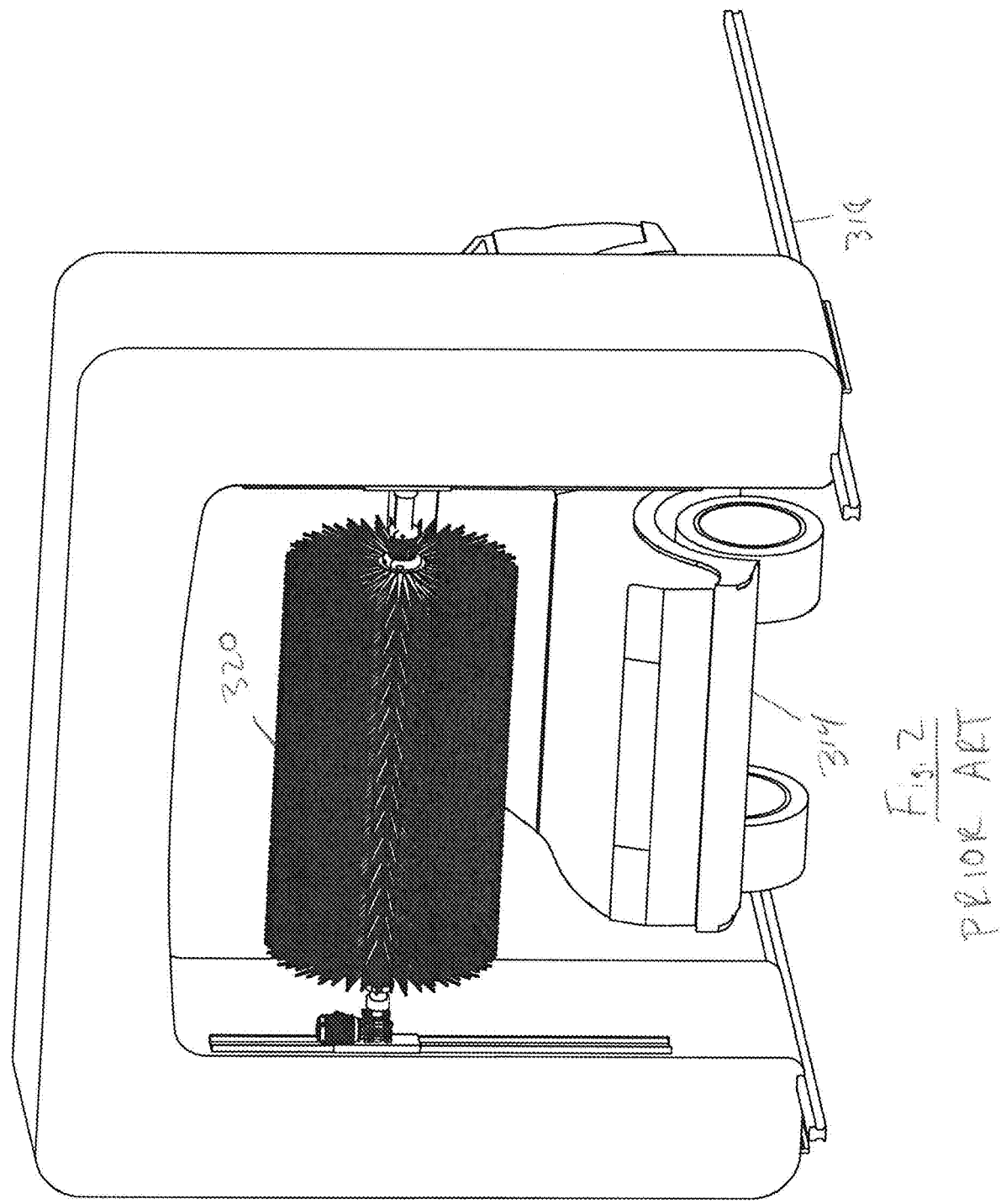
FIG. 2 illustrates the prior art system of FIG. 1, with the top brush in an intermediate position.
Figure 3:
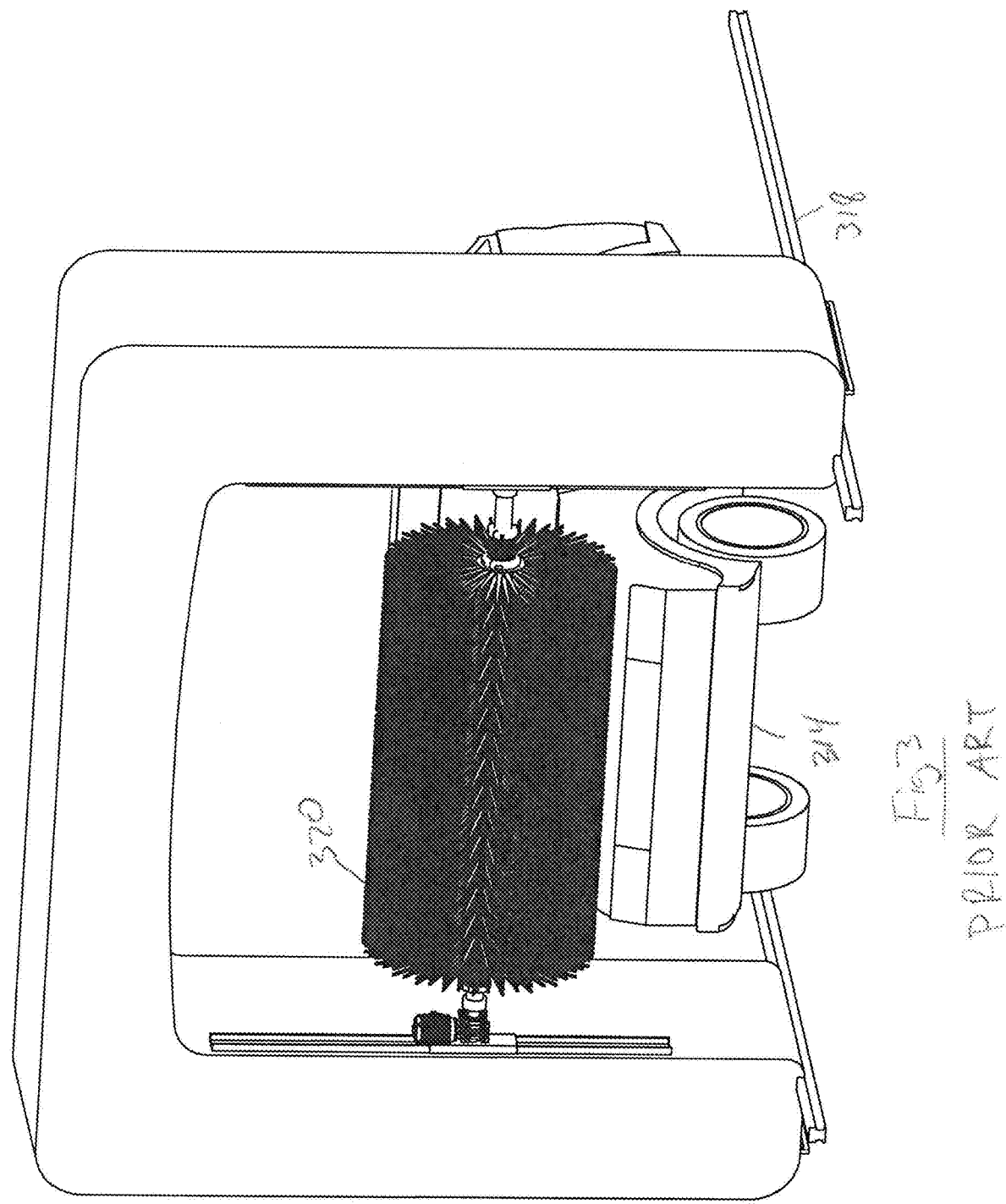
FIG. 3 illustrates the prior art system of FIG. 2, with the top brush in a lower position.

FIGS. 1-3 illustrate a prior art vehicle wash system 300, which includes a vehicle treatment area 312 where a vehicle 314 is to be positioned in a vehicle wash for treatment thereof. As shown, the wash system 300 includes a frame 316 supported on a horizontal rail system 318, such that the frame 316 may reciprocate forwardly and rearwardly on the rail system 318 to travel over the length of the vehicle treatment area 312 and the vehicle 314 therein. As shown in FIGS. 1-3, the rail system 318 is in the form of ground engaging rails, and the frame extends upwardly from the rail system 318 and passes over the top of the vehicle treatment area 312.

The frame 316 may include various vehicle treatment components supported thereon, such as a top brush 320 oriented generally horizontal to the ground and disposed for treatment of an upper surface of the vehicle 312. The frame 316 may include a pair of vertical rails 322 attached at laterally opposite sides of the frame 316. The rails 322 may support a horizontal shaft 324 that extends laterally between the rails 322 and that supports the top brush 320 for rotation. The top brush 320 is vertically moveable along the rails 322 in order to be disposed at different vertical heights relative to the vehicle treatment area 312 and the vehicle 314 disposed therein under direction of a control system in cooperation with various feedback devices such as a torque sensor.

FIG. 1 shows the top brush 320 in an upper position, in which the top brush 320 may be passed over the top of the vehicle 314 by translating the frame 316 rearward. Similarly, in this position, the vehicle 314 may pull forward through the frame 316 and under the top brush. In this position, there is a reduced likelihood of damage to the vehicle 314 or the top brush 320, because the vehicle 314 may pass the top brush 320 without contacting any rigid structure.

FIG. 2 shows the top brush in a middle position, in which the top brush 320 has been lowered relative to the top position, and may be in line with the vehicle windshield. In this position, there is an increased likelihood of damage to the vehicle 314 or the top brush 320 in the event the vehicle 314 or brush 320 are moved horizontally toward each other, because the shaft or other support structure of the brush 320 may impact the top of the vehicle 314.

FIG. 3 shows the top brush 320 in a lower position, in which the top brush 320 is vertically aligned with a front portion of the vehicle. In this position, there is a high likelihood of damage to the brush 320 and vehicle 314 if the vehicle 314 pulls forward or if the brush 320 is moved rearward and is not raised in accordance with the top contour of the vehicle 314.

FIGS. 1-3 illustrate an example of a rollover type wash system, but the above use of the vertical rails 322 and the top brush 320 are also known to be applied to conveyor type systems in which the vehicle 314 is moved past a horizontally stationary top brush 320. The top brush 320 must still be controlled to be raised and lowered according to the vehicle contour, and there is an increased potential for damage if the vehicle 314 is conveyed into the brush 320 when it is in a lowered position relative to the top position.

With reference to FIGS. 4-21, according to an aspect, the disclosed vehicle wash system 10 includes a vehicle treatment area 12 where a vehicle 14 is to be positioned in a vehicle wash for treatment thereof. As shown, the wash system 10 can include a frame 16 disposed adjacent the vehicle treatment area 12. According to an aspect, the frame 16 may be supported on an overhead rail system 18 such that the frame 16 may reciprocate forwardly and rearwardly on the overhead rail system 18 in order to travel over the length of the vehicle treatment area 12 and the vehicle 14 therein. According to one aspect, the frame 16 does not travel on ground engaging rails. The frame 16 may also support a plurality of treatment components configured to treat an exterior surface of the vehicle 14. According to an aspect as shown in the Figures, the frame 16 may support a top brush 20 oriented generally horizontal to the ground and extending laterally across the vehicle treatment area 12 and disposed for treatment of an upper surface of the vehicle 14. The frame 16 may also support a pair of side brushes (not shown) configured to travel along and treat either side of a vehicle 14 in the vehicle treatment area 12. The pair of side brushes can be oriented generally perpendicular to ground.

The frame 16 may carry a variety of other or different treatment components, such as foam nozzles and fluid nozzles, which can emit foam or high pressure fluid onto both the top and sides of the vehicle 14 in the vehicle treatment area 12. It will further be appreciated that the frame 16 may carry or support a variety of other or different vehicle treatment components. The frame 16 may also have a variety of different configurations and may be supported in a variety of suitable ways. It will be appreciated that the frame could be eliminated and that the top brush and other components could be supported in a variety of other suitable ways. The foam nozzles and the fluid nozzles, and other vehicle treatment components attached to the frame 16 may have a variety of different configurations.

According to an aspect, the disclosed vehicle wash system 10 can provide improved cleaning capabilities without yielding a significant increase in the time of the wash process. According to a further aspect, the disclosed vehicle wash system 10 can provide a decrease in the time required to effectuate a vehicle wash process as compared to prior rollover wash systems. The vehicle wash system 10 can include a control system 30 that is in communication with the frame 16 and the various wash components to effectuate the vehicle cleaning process. According to an aspect, the control system 30 can include an electronic motor controller, a programmable logic controller and a communication network on which all of the components can communicate. According to another aspect, the communication network may be an Ethernet network. It will also be appreciated that the communication network can be configured such that components communicate on a wireless network. It will be appreciated that the control system 30 can include a variety of other components. The control system 30 can thus allow the various components on the system to talk to one another. The control system 30 can also allow for the generation of e-mails and other notifications that can be delivered, including to the operator of the vehicle wash, such as to advise of any faults with the system.

Figure 4:
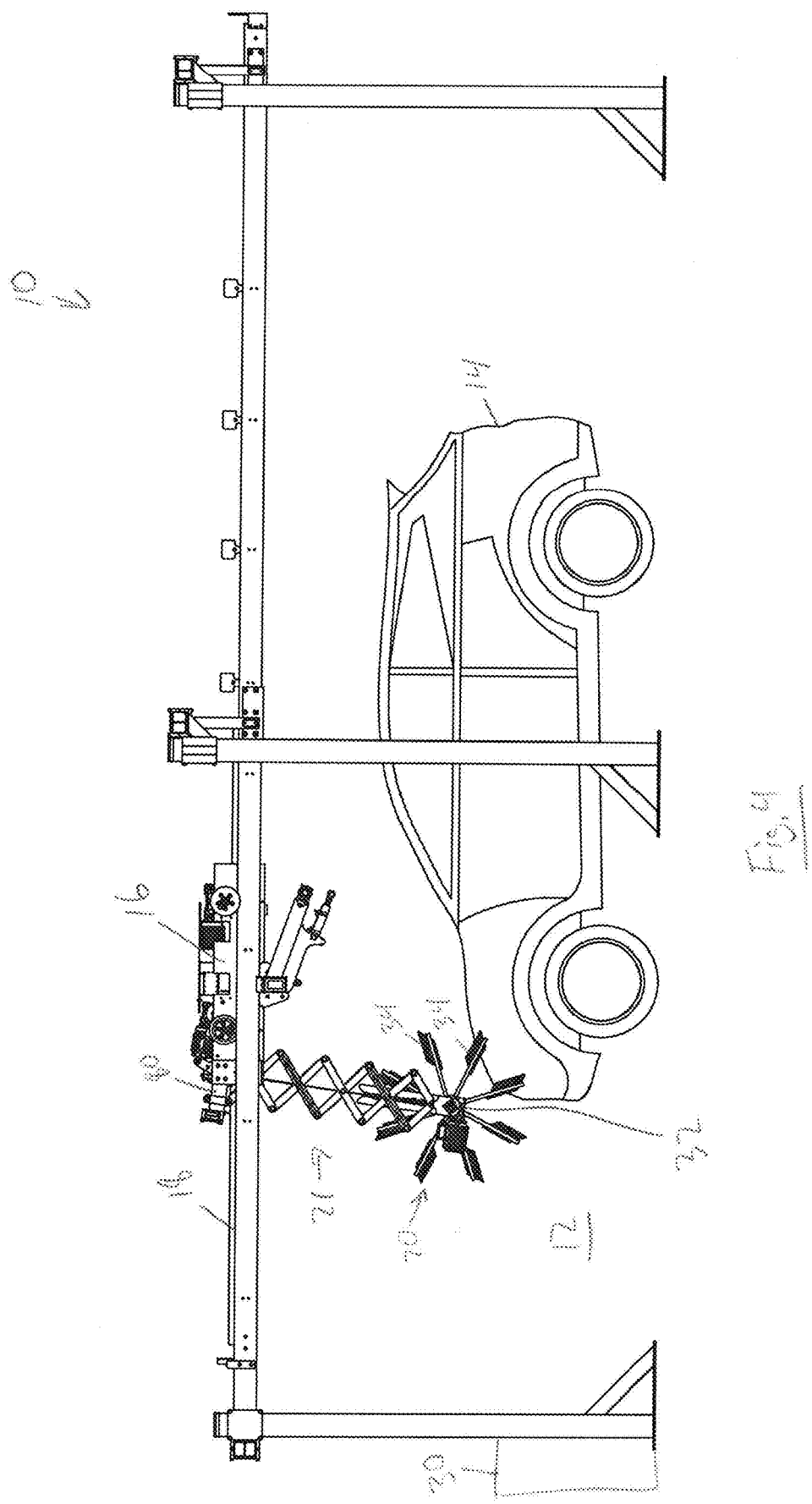
FIG. 4 illustrates a vehicle wash system with a vehicle disposed within a vehicle treatment area, a frame supported on elevated rails and disposed above the vehicle treatment area, and a top brush attached to the frame via an adjustable support structure that extends downward from the frame, with the top brush in a pivoted position in accordance with an aspect of the present disclosure.

According to an aspect, the top brush 20 can include a hub portion 32 and a plurality of wash media elements 34, as shown in FIG. 4, disposed around and in communication with the hub portion 32. Each hub portion 32 may be in communication with an axle that is secured to or otherwise coupled to the hub portion 32 to effect rotation thereof. Preferably, the plurality of wash media elements 34 are coupled to or secured to the hub portion 32. The drive axle may be in communication with a power source such as a motor. It will be appreciated that a variety of suitable power sources may be employed to effect rotation of the top brush 20. According to an aspect, the wash media elements 34 may be constructed of an EVA foam and may be generally self-supporting along their length. An exemplary media element is disclosed in U.S. Pat. No. 8,990,993, which is owned by the Assignee of the present application. It will be appreciated that the wash media elements 34 may have a variety of different shapes and configurations and may be constructed from a variety of different materials.

According to a further aspect, the system as an initial step may determine a profile of the vehicle 14 in the vehicle treatment area 12 to be washed. It will be appreciated that this profiling of the geometry of the vehicle 14 may be accomplished in a variety of ways, including by employing a variety of sensors or other detection devices. According to an aspect, the geometric profiling may be accomplished in an initial pass of the frame 16 over the vehicle 14. It will also be appreciated that the geometric profiling can be accomplished in a variety of different ways or by multiple passes of the frame 16 over the vehicle 14. According to a further aspect, the geometric profiling can be accomplished when the vehicle enters the vehicle wash facility or the vehicle treatment area to eliminate a preliminary mapping or profiling pass of the frame 16.

According to an aspect, once the vehicle exterior has been mapped by the control system 30, it can use this information to dynamically increase the travel speed of the frame along the overhead rail system 18 as appropriate to speed up the wash process. With a roll over wash system, speed of the process is important as, the shorter the wash process, the more processes that can be completed in a given day, which means more revenue for a wash operator.

According to an aspect, with the mapped vehicle exterior, the control system 30 can divide the vehicle into individual segments and then can adjust the position of the top brush 20 and its travel speed as disclosed in more detail in Applicant's concurrently filed patent application entitled "VEHICLE WASH SYSTEM HAVING A MULTI-SPEED CAR WASH BRUSH", which is hereby incorporated by reference as though set forth fully herein. According to an aspect, the control system 30 can also vary or adjust the rotational speed of the top brush 20 based on its location with respect to certain vehicle segments. Thus, the linear movement speed of the components and their rotational speed can be dynamically varied depending upon vehicle geometry and other factors. It will also be appreciated that different types of vehicles can have different segments. Exemplary segments can include the following: (i) hood, (ii) windshield; (iii) roof; (iv) rear window. The control system 30 can obviously take into account a variety of other segments.

According to another aspect as shown for example in FIGS. 12-21, the top brush 20 may be supported by the frame 16 to allow for more accurate following of a top exterior surface of a vehicle 14 to provide improved cleaning. The top brush 20 may also be in communication with the control system 30 so the top brush may be properly located vertically with respect to an upper profile of the vehicle 14. As shown in the Figures, the top brush 20 may be supported on a linearly adjustable frame 21, which may also be referred to as a linear frame 21 or linear extension mechanism 21, which allows for vertical movement of the top brush 20 relative to the frame 16. This allows the top brush 20 to be lowered and raised vertically by a control motor 122, which may be in communication with the control system 30. The top brush 20 may also be raised and lowered by a control means other than a motor.

The linear frame 21 may be pivotally attached to an overhead portion of the frame 16 such that it may swing or move forward and backward (in the direction of vehicle travel). This multiple degrees of travel provides improved safety and minimized damage to the top brush 20. If a vehicle were to bump the top brush 20, the linear frame 21 can swing without damage to itself or the top brush 20. The linear frame 21 may have various forms that permit the top brush 20 to be raised and lowered in a controlled manner. It will be appreciated that the reference to vertical movement corresponds to the arrangement in which the top brush 20 moves in a vertical direction when it is raised and lowered, and in the event the linear frame 21 is tilted relative to vertical, that the vertical movement will not be vertical, but will travel along the angle of tilt.

As shown throughout the Figures, the linear frame 21 is shown in the form of a scissors mechanism. However, it will be appreciated that the illustrated scissors mechanism is but one example of the linear frame 21, and that other mechanisms capable of linear extension and retraction may also be used, such as a telescoping mechanism.

The linear frame 21 may be secured to pivoting frame portion 80, which may be pivotally secured to an overhead portion of the frame 16 at an upper pivot point 66. Thus, the pivoting frame portion 80 may pivot relative to the frame 16 via the pivot point 66. The linear frame 21 may be extended and retracted in a linear direction relative to the pivoting frame portion 80. In that sense, the pivoting frame portion 80 and the linear frame 21 remain in linear relationship with each other, with both the pivoting frame portion 80 and the linear frame 21 being ultimately pivotable relative to the frame 16.

Figure 8:
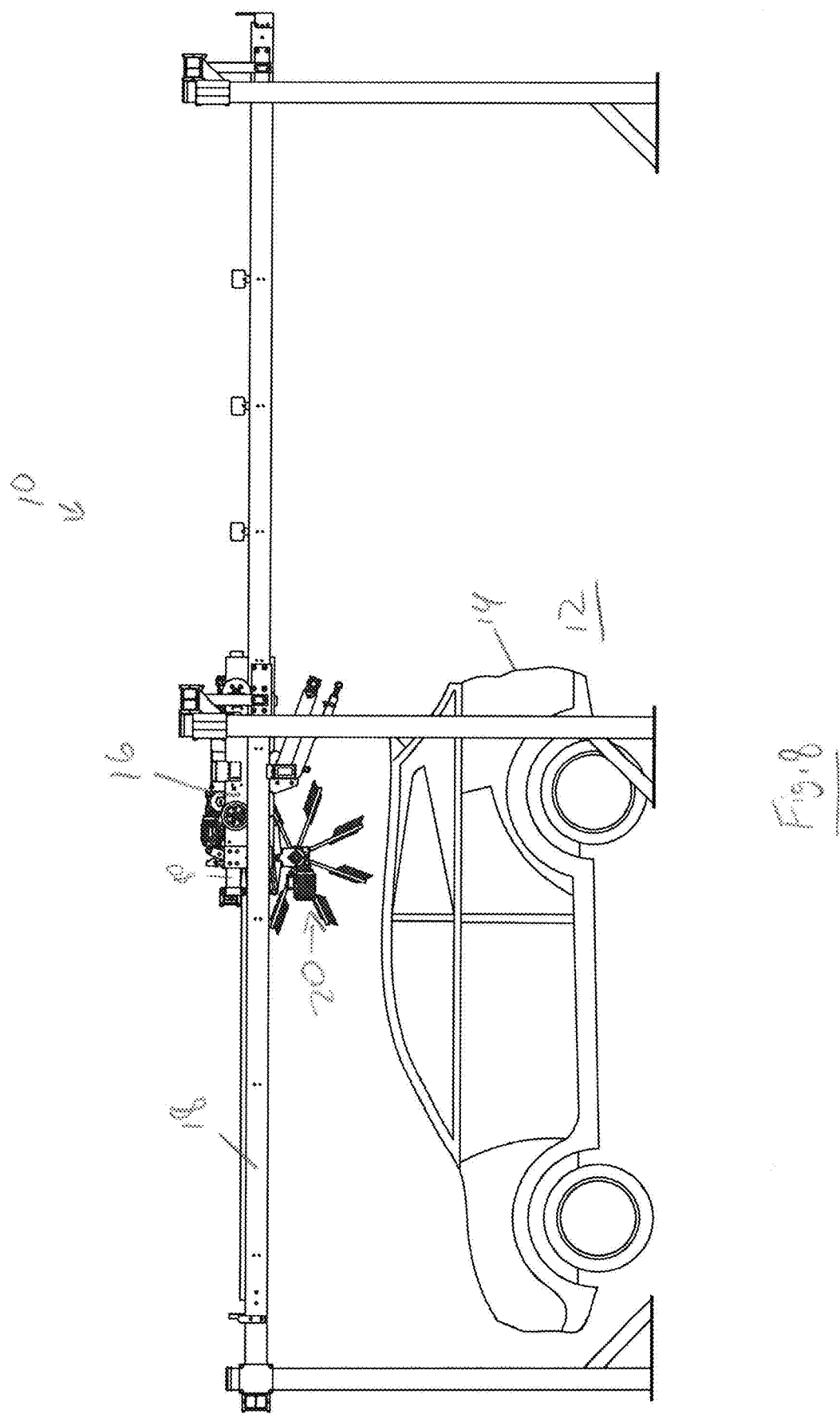
FIG. 8 illustrates the system with the top brush retracted fully and not pivoted, and the vehicle pulling further forward in accordance with an aspect of the present disclosure.

In the retracted position, shown in FIG. 8, the top brush 20 can be removed upwardly away from potential contact with a vehicle exterior.

As will be appreciated, the linear frame 21 may be in communication with the drive motor 122 that is in communication with the control system 30 to move the linear frame 21 between the retracted and the expanded positions shown throughout the Figures. According to an aspect, the drive motor 122 can be actuated by the control system 30 based on the type of vehicle 14 in the vehicle treatment area 12 as well as based on the mapping of the vehicle profile.

According to an aspect, the arrangement and connection of the top brush 20 to the frame 16 yields a connection without permanent vertical rails. Instead, the linear frame 21 acts as the guide to raise and lower the top brush 20. When the linear frame 21 is retracted, there are no downward hanging guides or rails into which a vehicle can bump or damage when it is pulling into the vehicle treatment area 12, which yields significant advantages over current rollovers with permanent downwardly extending guides. This also serves to minimize downtime of the wash system 10 and any lost revenue associated with that downtime. It will also be appreciated that the top brush 20 may be raised and lowered in a variety of other suitable ways.

Figure 5:
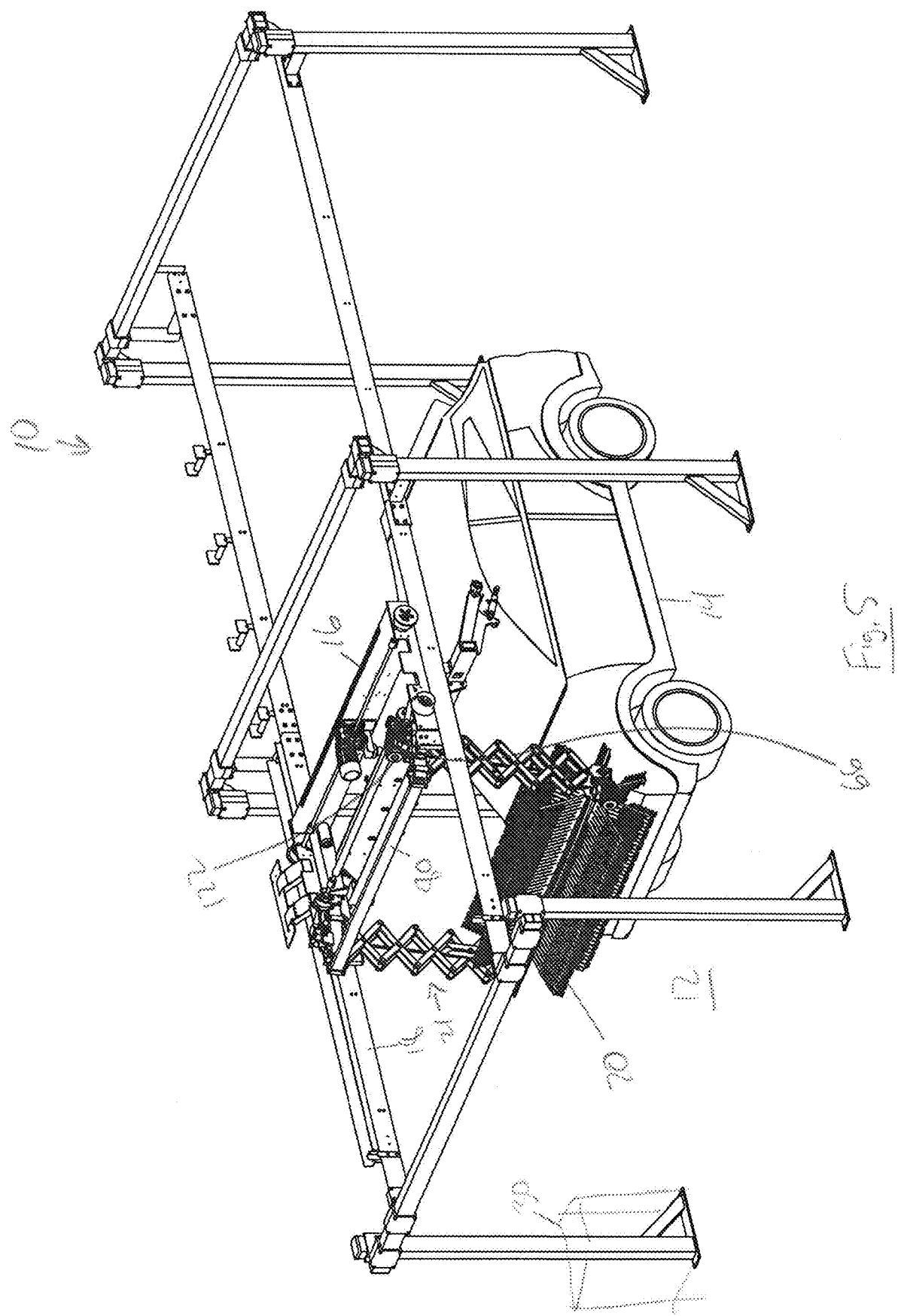
FIG. 5 illustrates a perspective view of the system in the same state as FIG. 4.

The pivotable linear frame 21 described above allows for a system that is resistant to damage in the event of vehicle pull through while the top brush 20 is in an extended position and lowered position. An example of the vehicle 14 pulling out of the vehicle treatment area 12 is shown in FIGS. 4-11. As shown in FIGS. 4 and 5, the vehicle 14 is in a position in the middle of the vehicle treatment area 12, and the top brush 20 is in an extended and lowered position and in the path of the vehicle 14. The top brush 20 is making contact with the front of the vehicle 14, which can be the result of the vehicle 14 moving forward or the brush 20 moving rearward.

Figure 6:
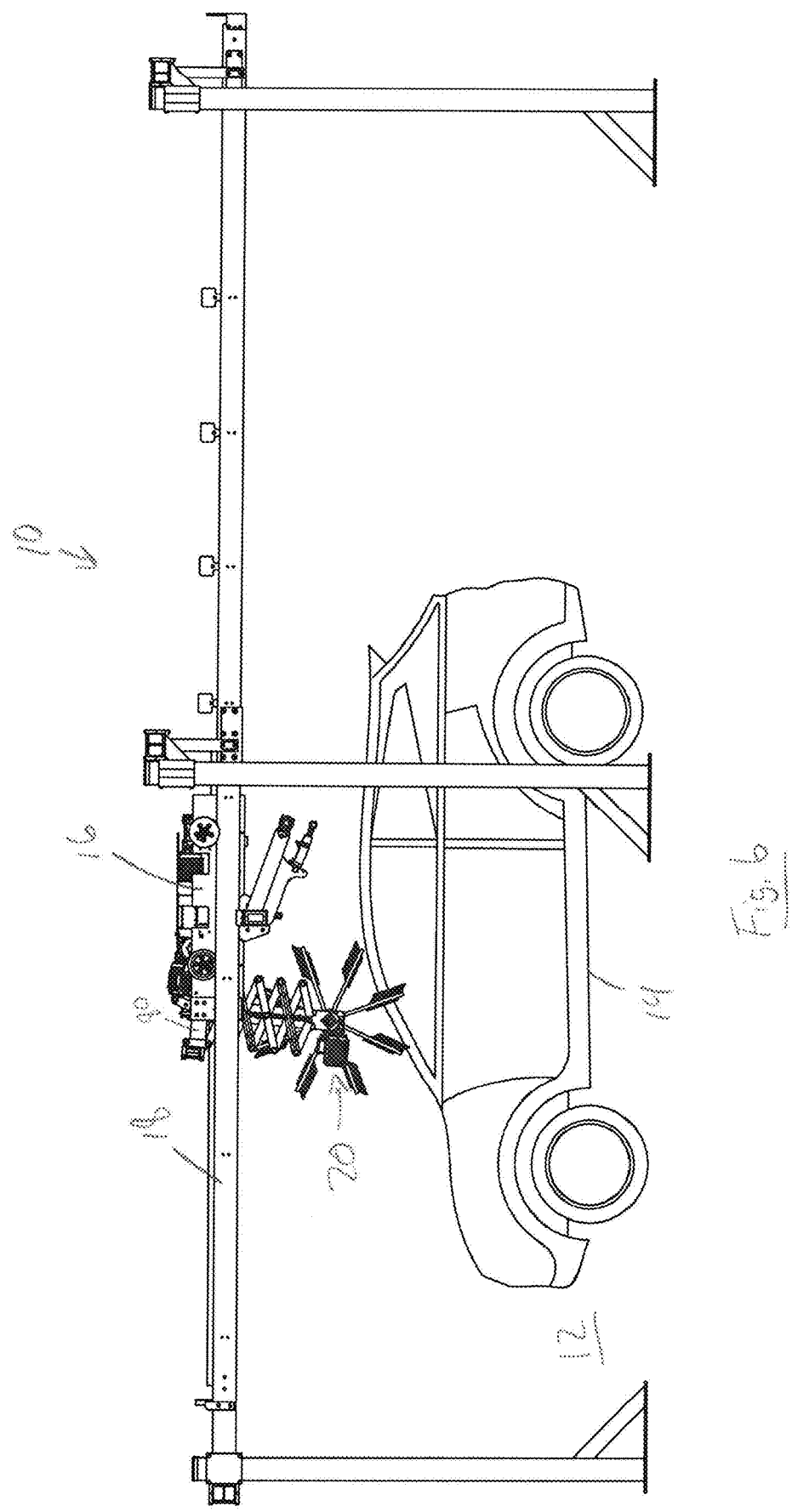
FIG. 6 illustrates the vehicle wash system, with the top brush retracted partially and pivoted, the frame moved rearward, and the vehicle pulling forward in accordance with an aspect of the present disclosure.
Figure 7:
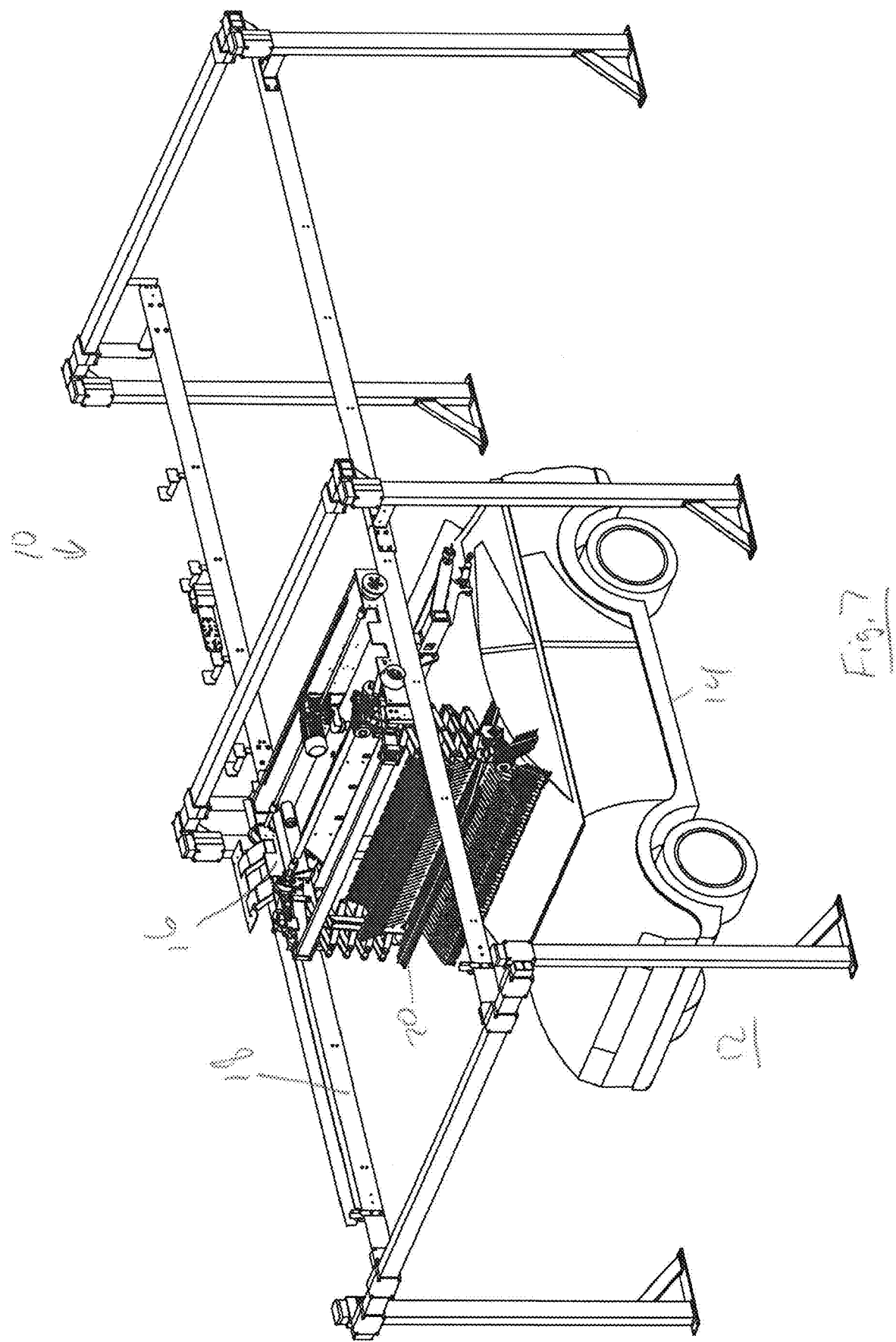
FIG. 7 illustrates a perspective view of system in the same state as FIG. 6.

As shown in FIGS. 6 and 7, following contact with the vehicle 14, the top brush 20 is retracted upward via the linear frame 21, and the frame 16 has moved rearward. This upward retraction may be made in response to the detected vehicle contour or in response to detecting that the vehicle 14 has contacted the top brush 20 and is pulling forward. In either case, precise torque control feedback is not necessary, because the top brush 20 may be pivoted relative to the frame 16 in response to contact with the vehicle 14, with the pivot frame member 80 described above pivoting relative to the frame 16. It will be appreciated that a control system with feedback devices may also be employed.

Figure 9:
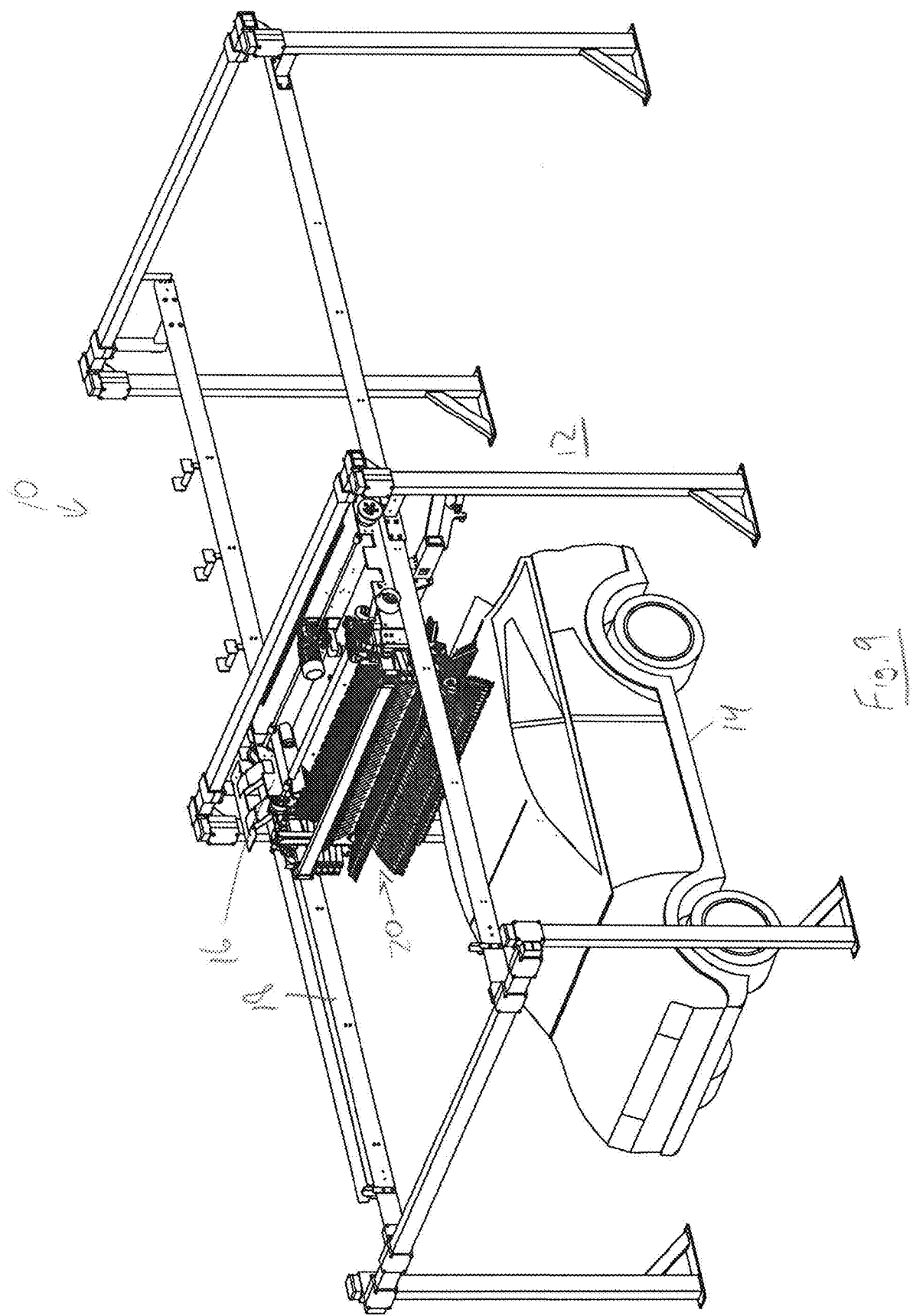
FIG. 9 illustrates a perspective view of system in the same state as FIG. 8.

FIGS. 8 and 9 illustrate the top brush 20 in a fully retracted state, which may be controlled based on the detected vehicle pull through to remove and protect the top brush 20 from further contact. The frame 16 has also moved further rearward. However, even without this defensive retraction, the top brush 20 may remain undamaged because of its ability to pivot in response to contact by pivoting the pivot frame member 80 relative to the frame. In FIGS. 8 and 9, the pivot frame member 80 is not pivoted, as the vehicle 14 is no longer in contact with the top brush 20.

Figure 10:
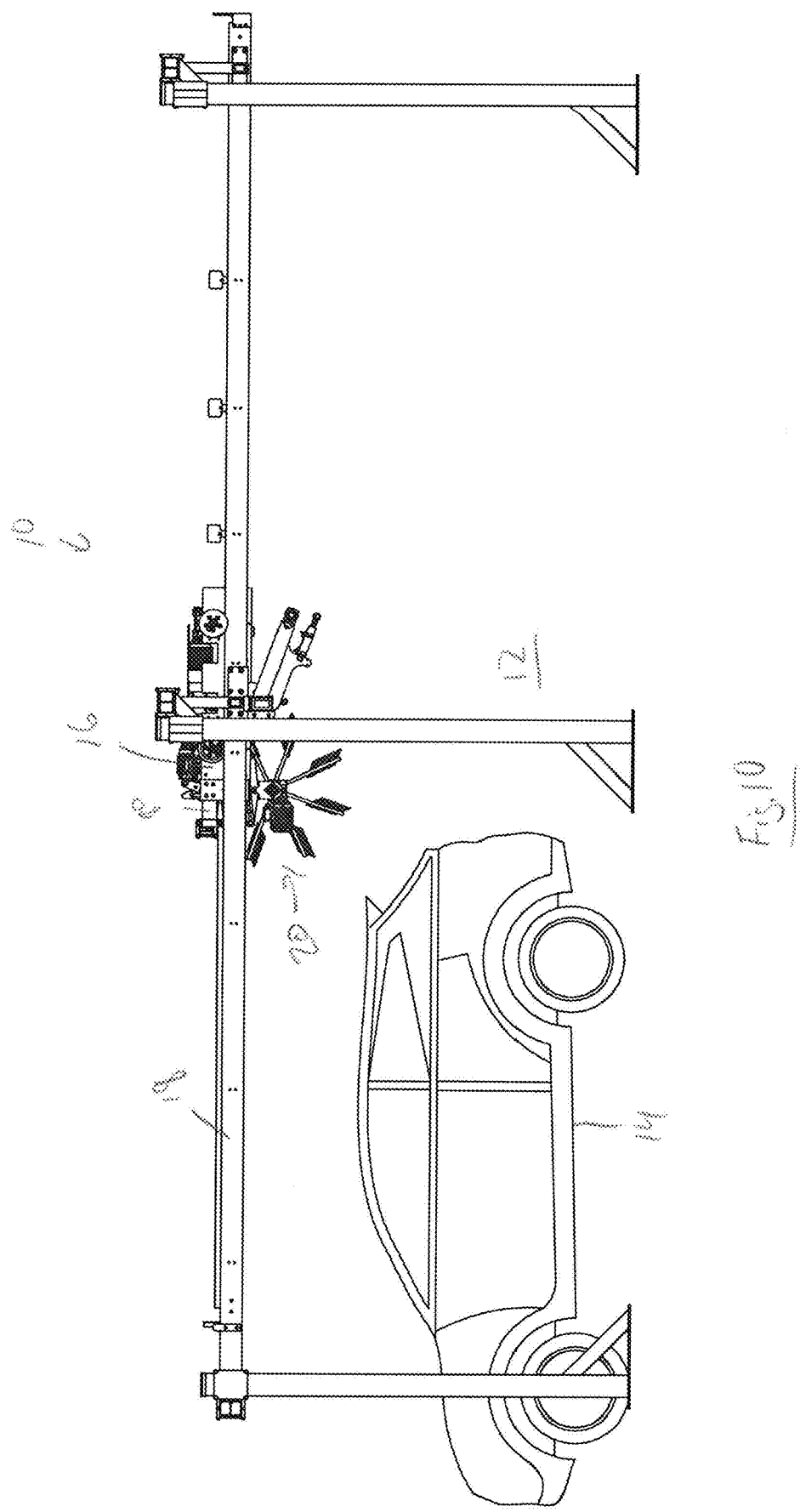
FIG. 10 illustrates the system with the frame moved further rearward and the vehicle pulled further forward in accordance with an aspect of the present disclosure.
Figure 11:
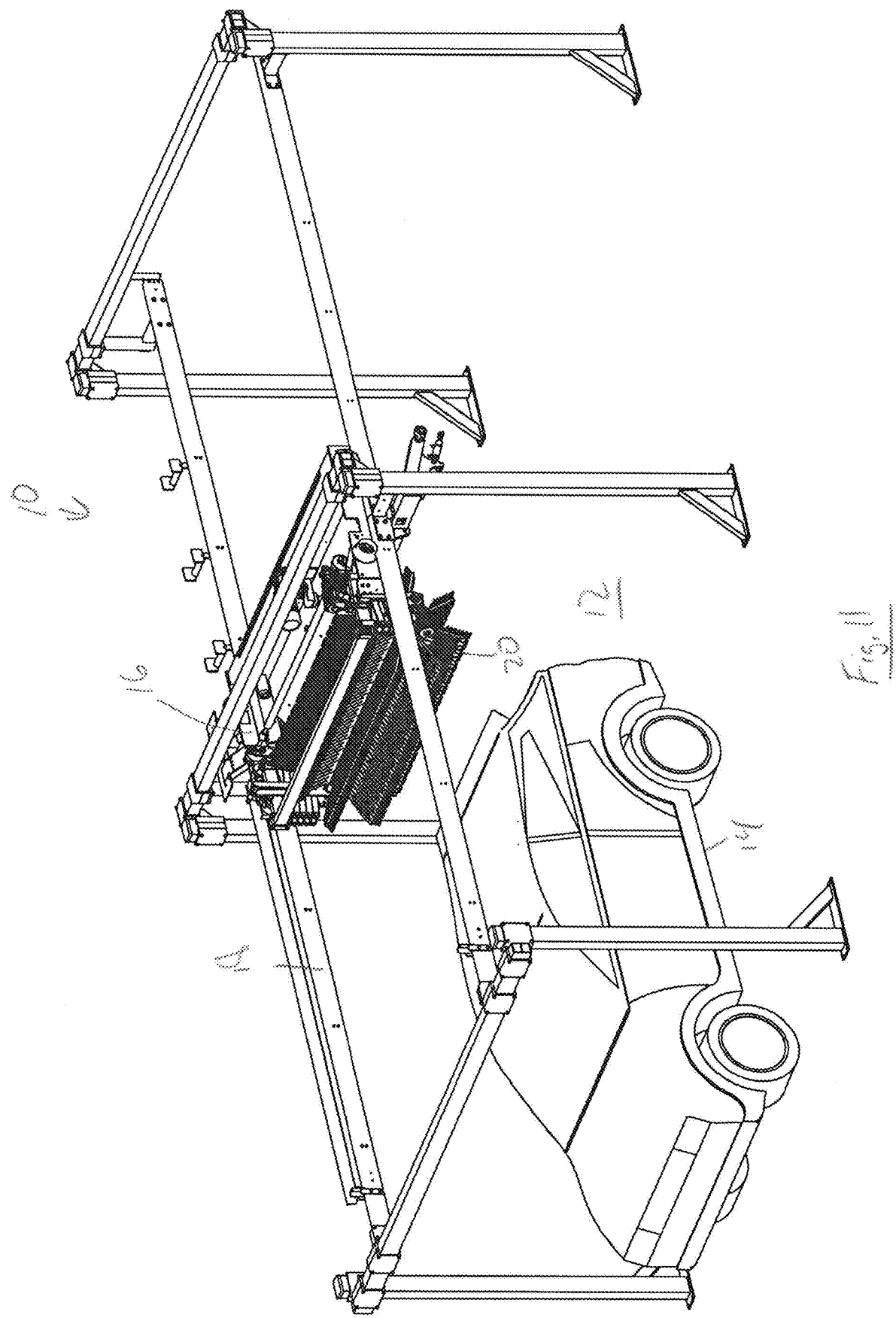
FIG. 11 illustrates a perspective view of system in the same state as FIG. 10.

FIGS. 10 and 11 illustrate the vehicle 14 pulling further forward, and the frame 16 having moved further rearward. The top brush 20 remains retracted, and the pivot frame member 80 remains in a non-pivoted state relative to the frame 16.

Thus, the system 10 allows for the top brush 20 and its support system to pivot in response to vehicle pull through. FIGS. 4-11 illustrated how the system 10 may retract the top brush 20 as the vehicle 14 is pulling through. However, the top brush 20 could also remain in an extended position, and the ability of the pivot frame member 80 to pivot relative to the frame 16 would cause the top brush 20 to pivot further to the left in the figures in response to vehicle pull through as the top brush 20 makes contact with the upper contour of the vehicle 14. As the vehicle passes the top brush, the top brush 20 may pivot back to vertical when it is no longer forced upward by the vehicle 14.

FIGS. 12-21 illustrate an example of the top brush 20 being controllable and pivotable while the vehicle 14 remains stationary, and further illustrates how the pivoting of the brush may be controlled to provide improved contact with a rear surface of the vehicle 14.

Figure 12:
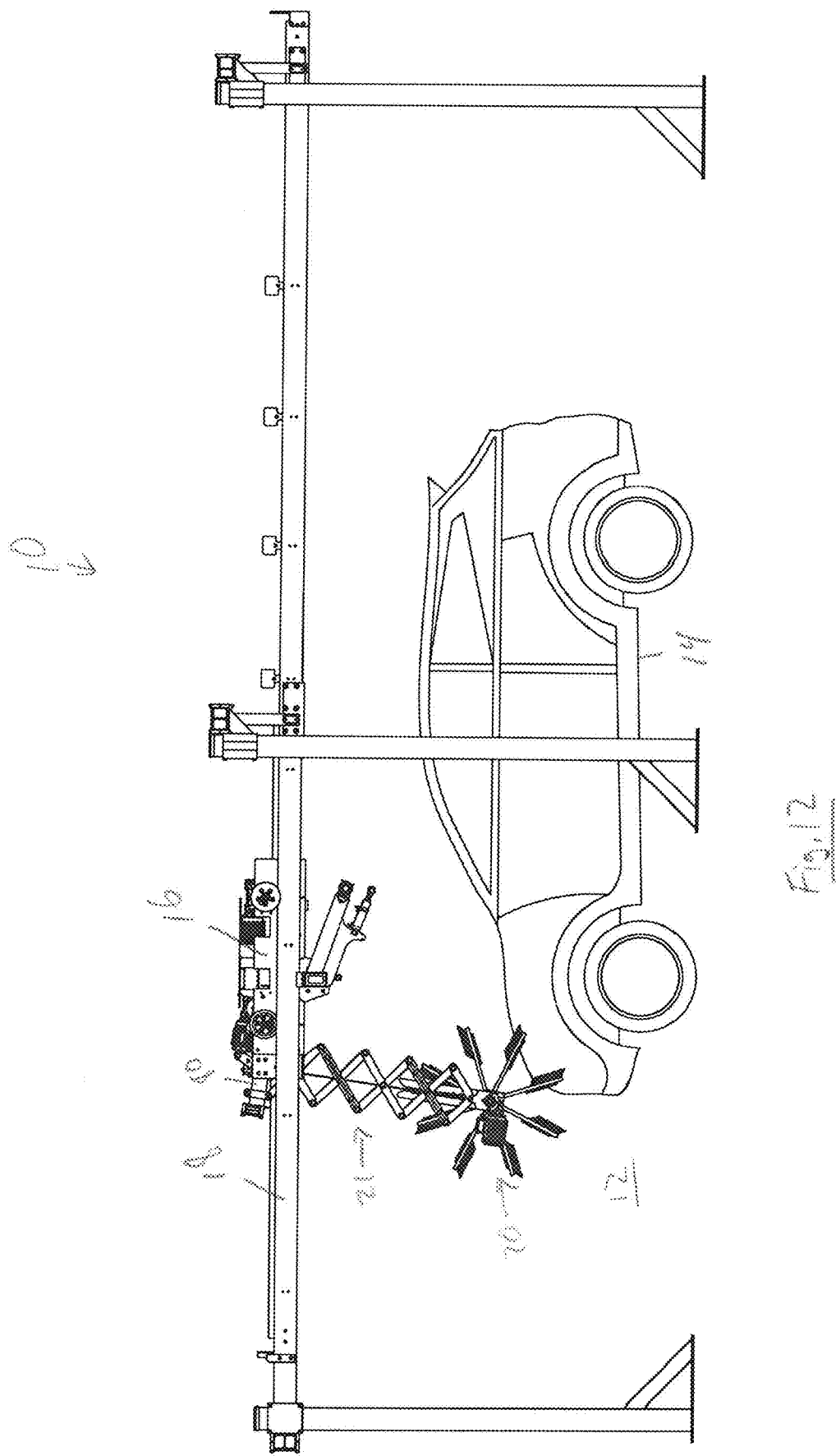
FIG. 12 illustrates the system in another state, with the top brush in a pivoted and extended position in accordance with an aspect of the present disclosure.
Figure 13:
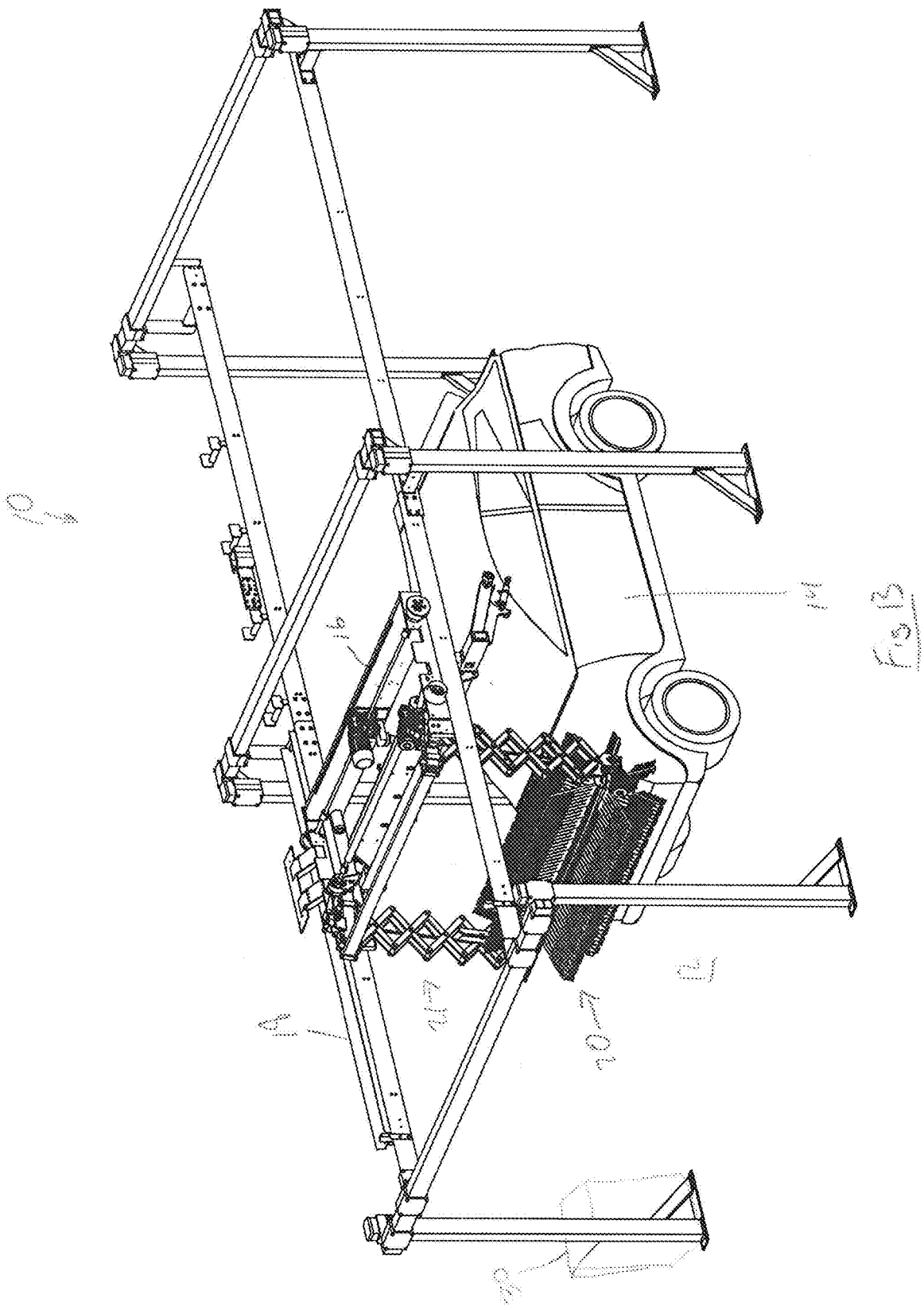
FIG. 13 illustrates a perspective view of system in the same state as FIG. 12.

With reference to FIGS. 12 and 13, the vehicle 14 is disposed in the middle of the vehicle treatment area 12, and the top brush 20 is extended downward and in contact with the front of the vehicle 14. The top brush 20 is pivoted relative to vertical, either in response to rearward movement into engagement with the vehicle 14 or in response to signals from the control system 30.

Figure 14:
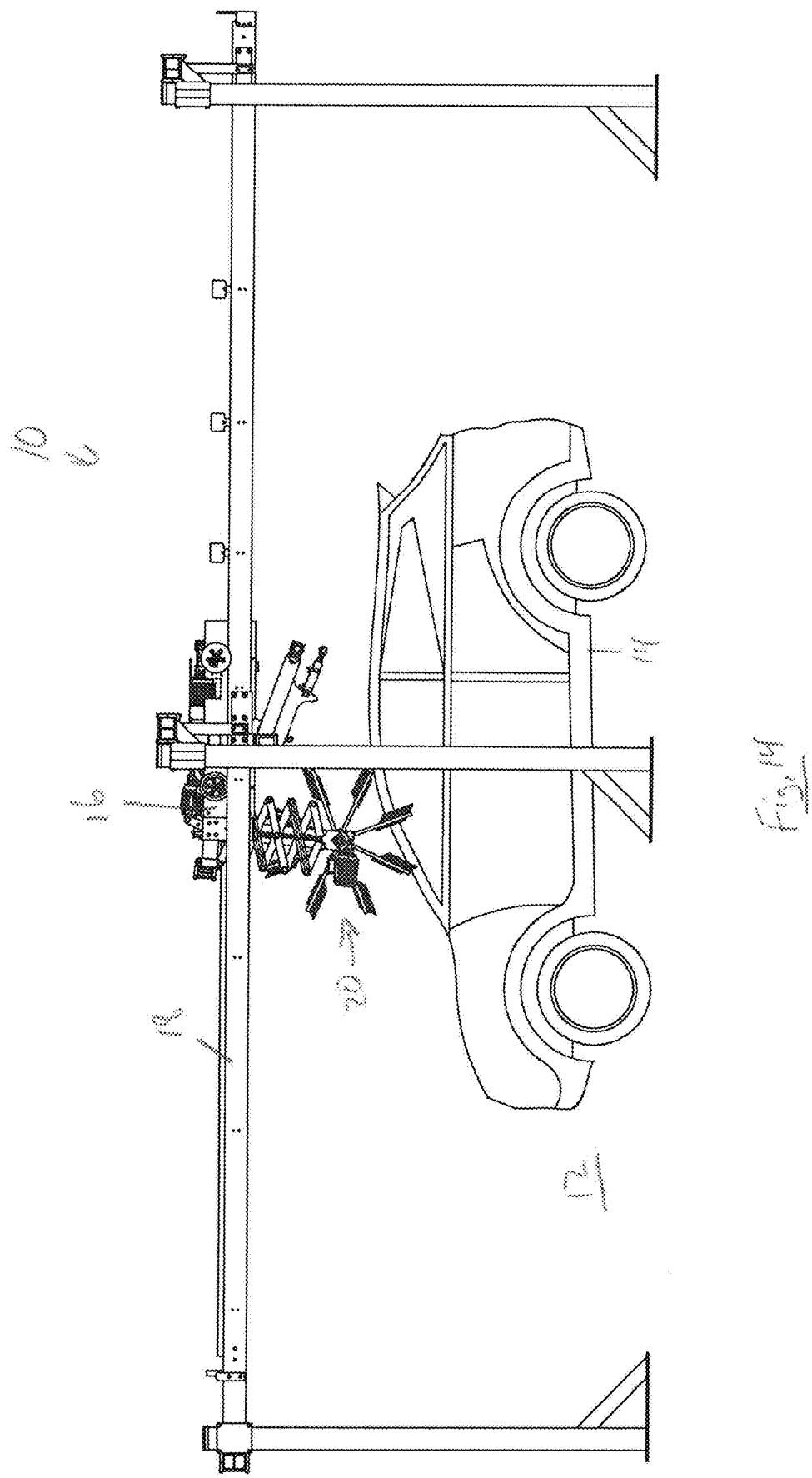
FIG. 14 illustrates the system in another state, with the top brush in a pivoted and partially retracted position in accordance with an aspect of the present disclosure.
Figure 15:
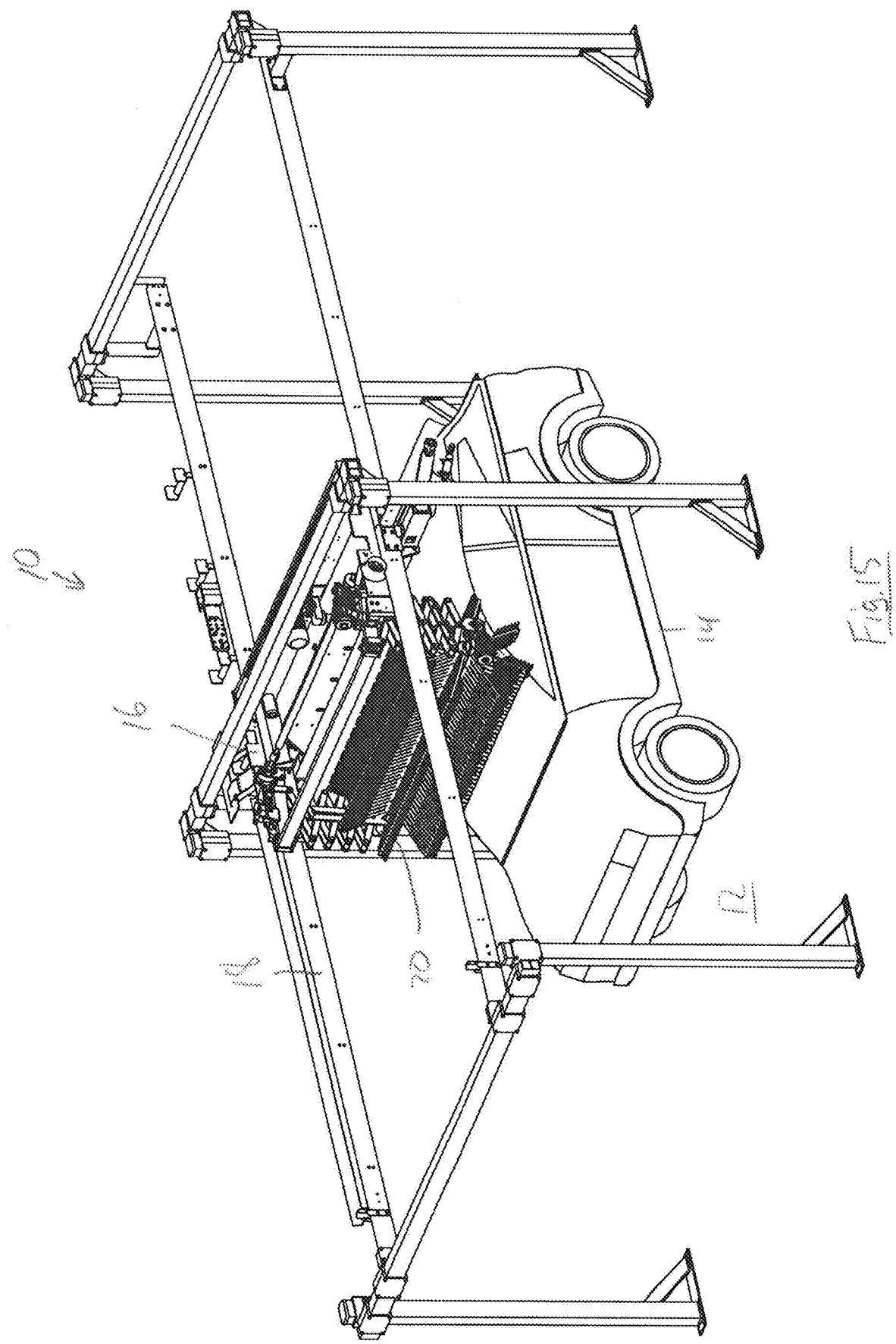
FIG. 15 illustrates a perspective view of system in the same state as FIG. 14.

FIGS. 14 and 15 show the top brush 20 in a partially extended position and the frame 16 having moved rearward, with the vehicle 14 in the same position as in FIGS. 12 and 13. The retraction of the top brush 20 relative to FIGS. 12 and 13 may be in response to signals from the control system based on the vehicle contour or in response to feedback from the top brush 20. The top brush 20 and pivot frame member 80 remain in a pivoted position.

Figure 16:
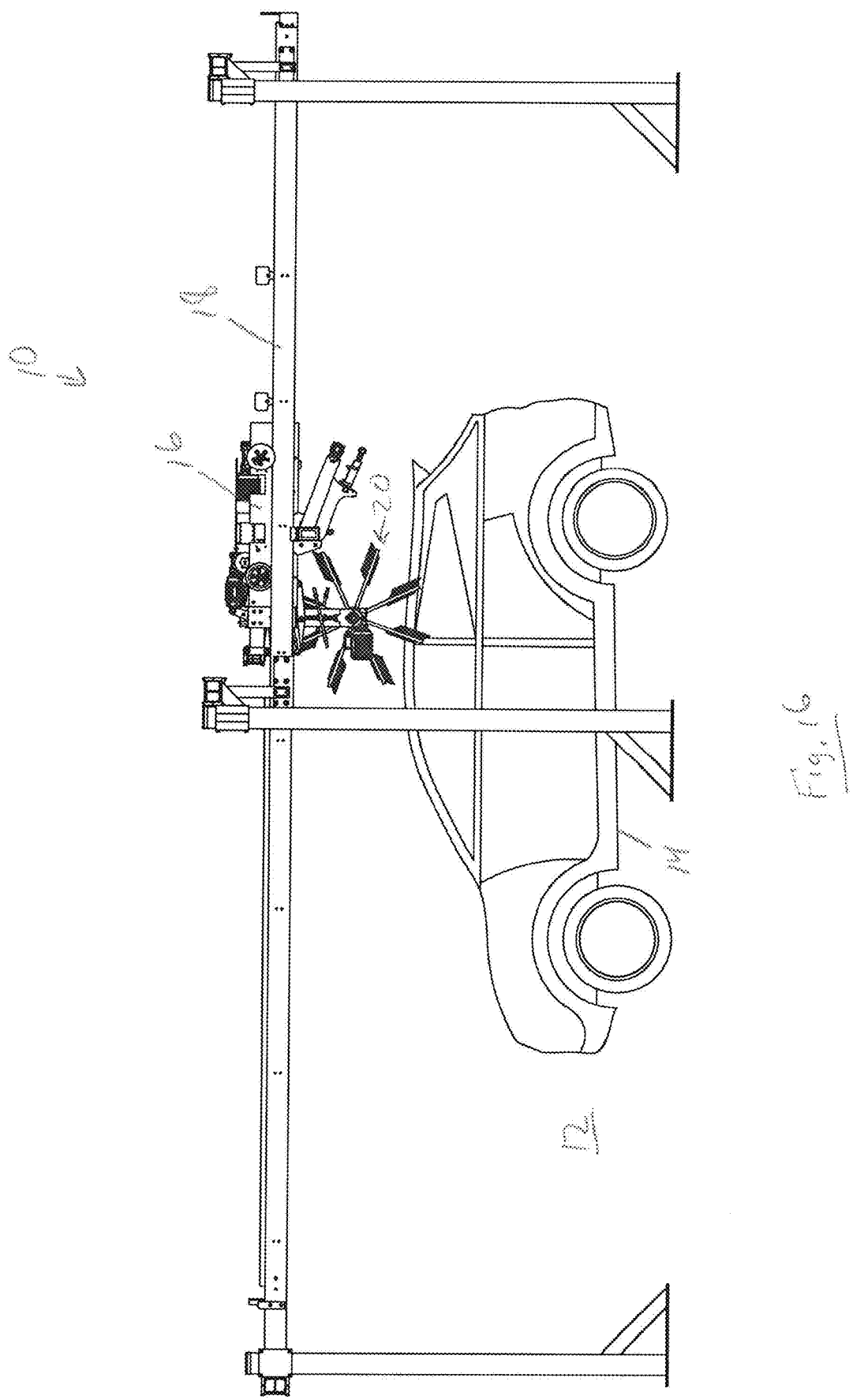
FIG. 16 illustrates the system in another state, with the top brush in a vertical and another retracted position in accordance with an aspect of the present disclosure.
Figure 17:
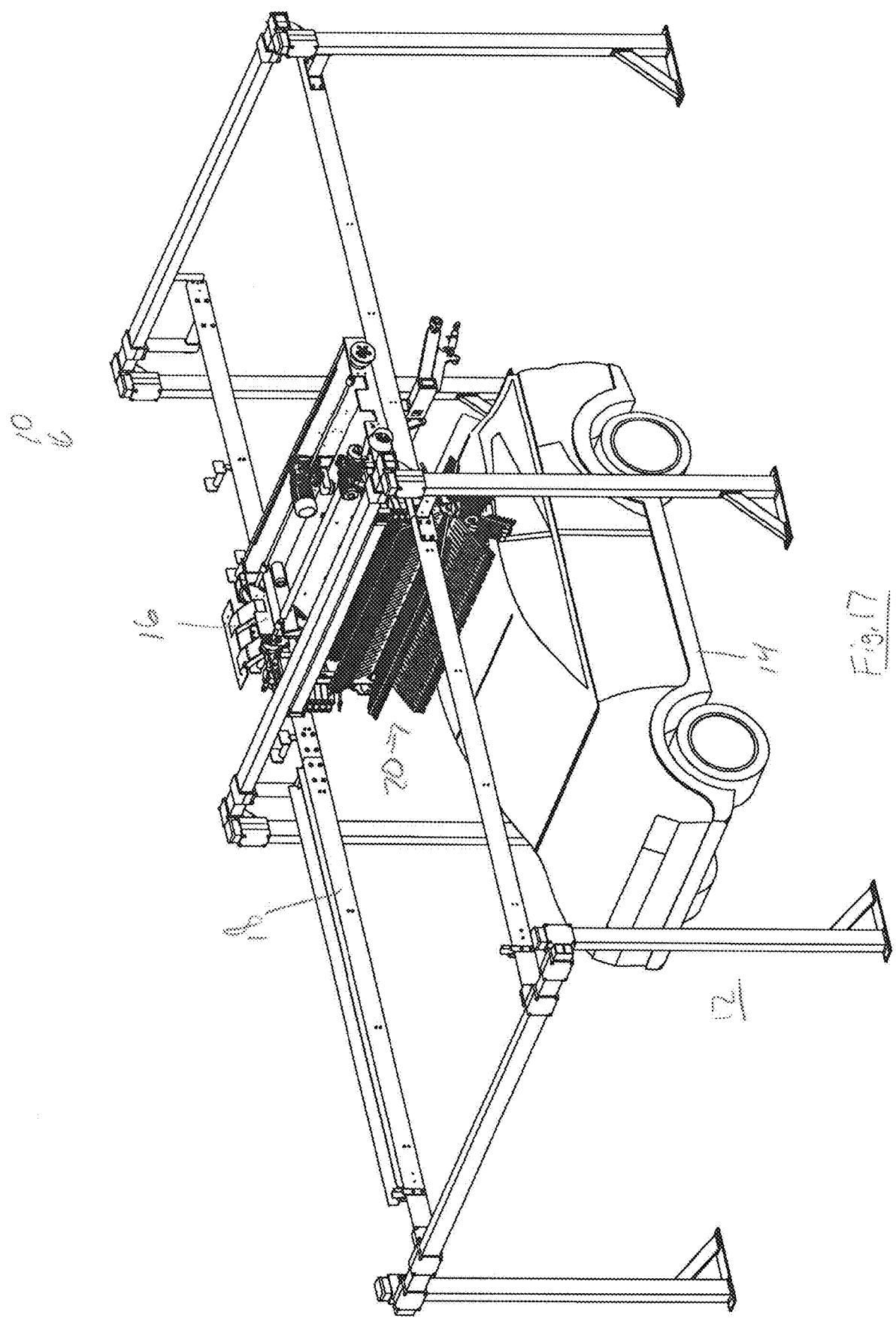
FIG. 17 illustrates a perspective view of system in the same state as FIG. 16.

FIGS. 16 and 17 illustrate a further rearward position of the top brush 20 and the pivot frame member 80 and frame 16, with the vehicle 14 remaining stationary. The top brush 20 is in a fully retracted position, and the pivot frame member 80 and top brush 20 are in a non-pivoted state relative to the frame 16. In this position, the top brush is contacting the upper roof surface of the vehicle 14.

Figure 18:
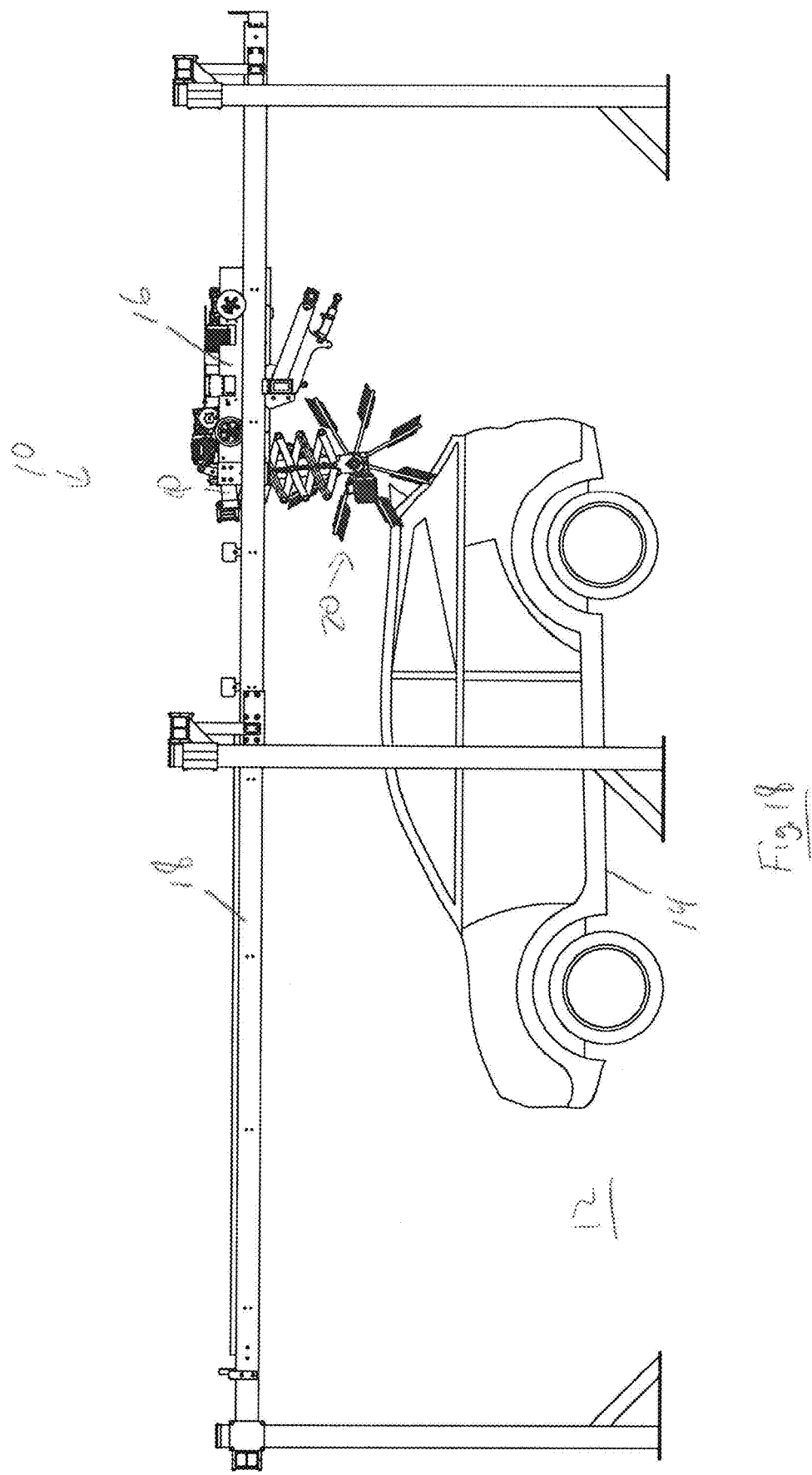
FIG. 18 illustrates the system in another state, with the top brush in a pivoted and another retracted position in accordance with an aspect of the present disclosure.
Figure 19:
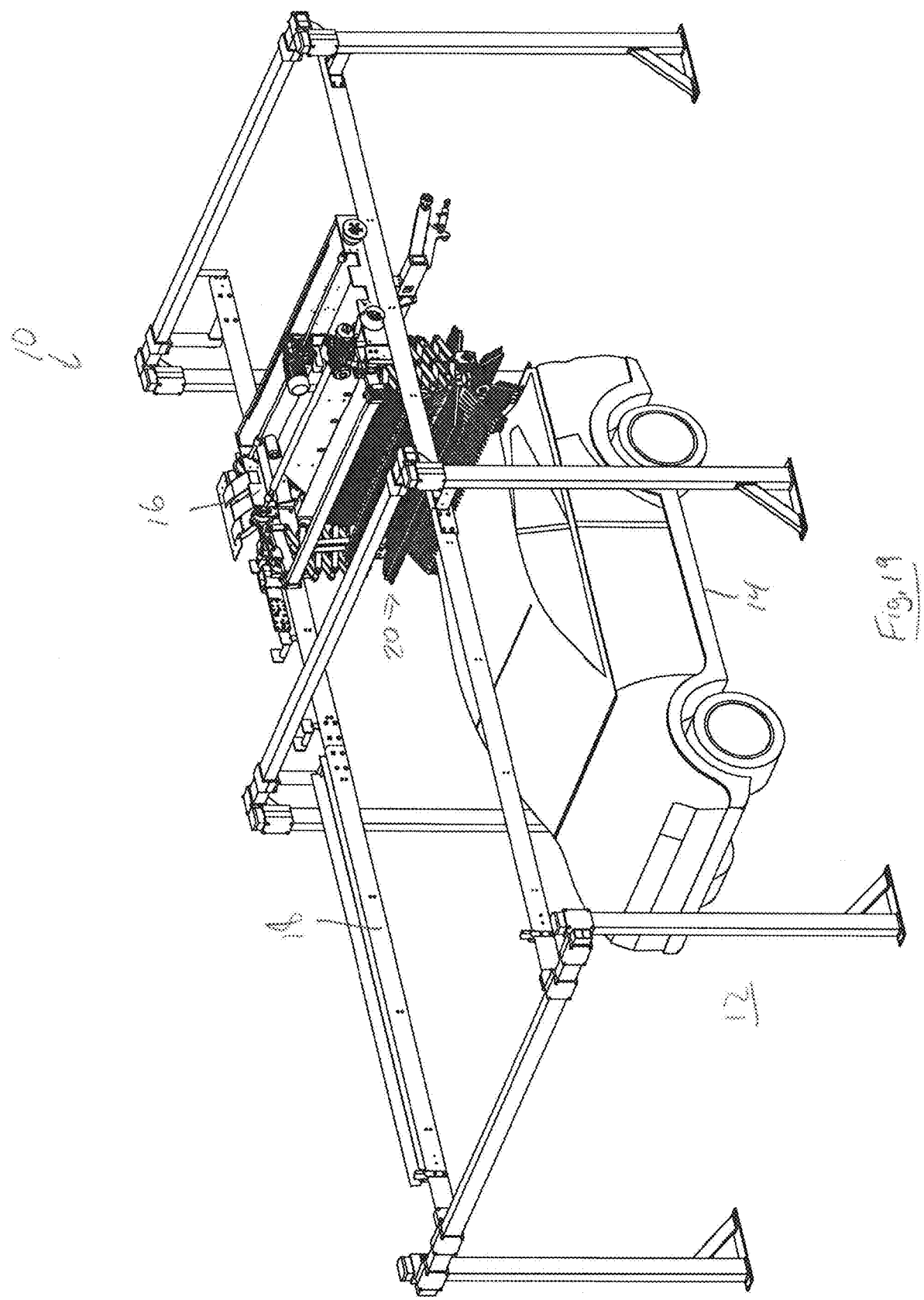
FIG. 19 illustrates a perspective view of system in the same state as FIG. 18.

FIGS. 18 and 19 illustrate a further rearward position of the top brush 20, frame 16, and pivot member 80. The top brush 20 is extended downward relative to FIGS. 16 and 17, and the top brush 20 and the pivot frame member 80 are pivoted relative to the frame 16. Unlike the previous pivoted positions of the top brush 20 and pivot frame member 80, the top brush 20 and the pivot frame member 80 are pivoted in an opposite direction relative to vertical. This opposite pivot direction may be in response to following the rear contour of the vehicle 14, or in response to specific controls from the control system 30. This pivoted position of the top brush 20 and the pivot frame member 80 provides for an improved wash on the rear surface of the vehicle, because the tendency for the top brush 20 and the pivot frame member 80 to return to vertical will bias the top brush 20 against the rear surface of the vehicle 14.

Figure 20:
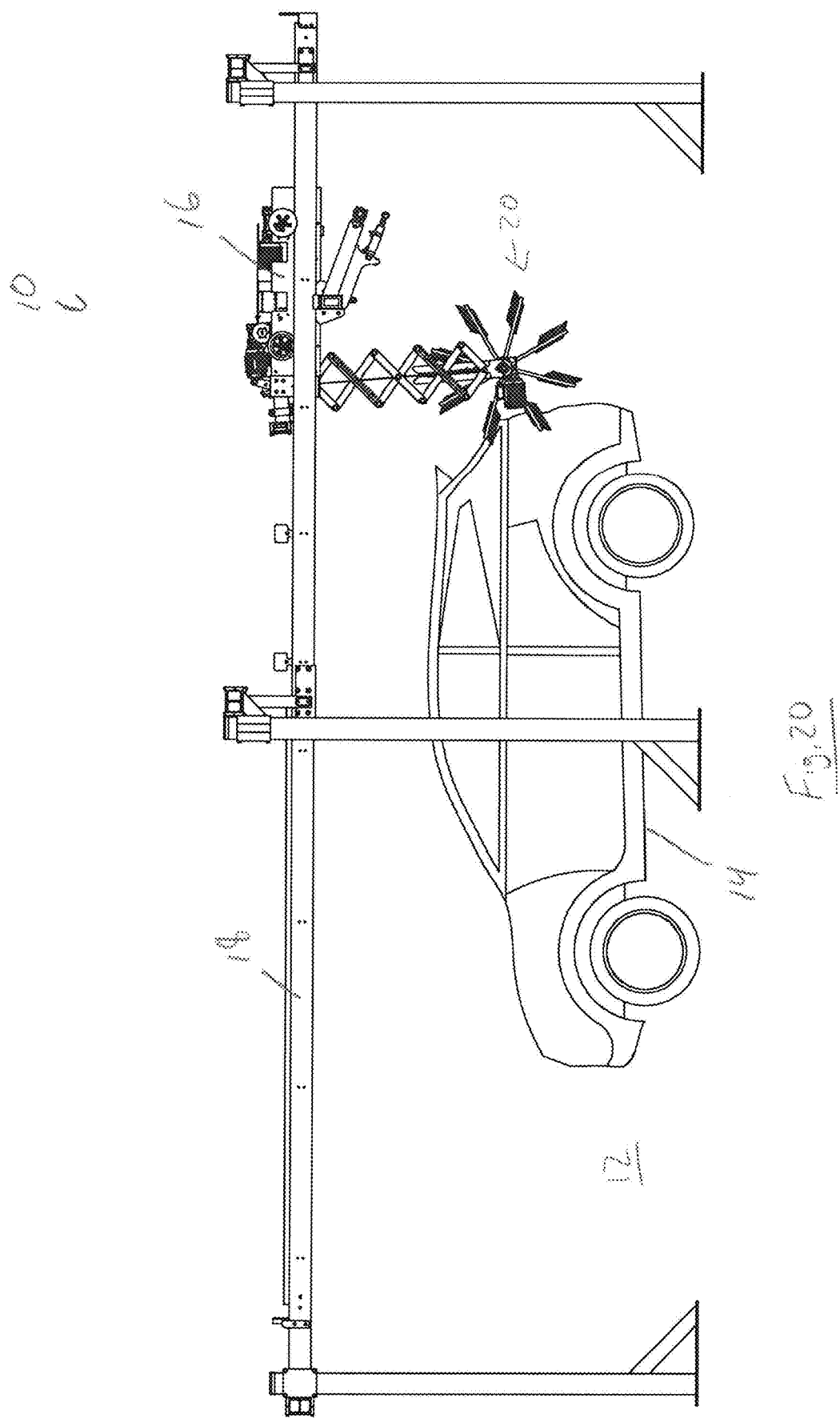
FIG. 20 illustrates the system in another state, with the top brush in a pivoted and another extended position in accordance with an aspect of the present disclosure.
Figure 21:
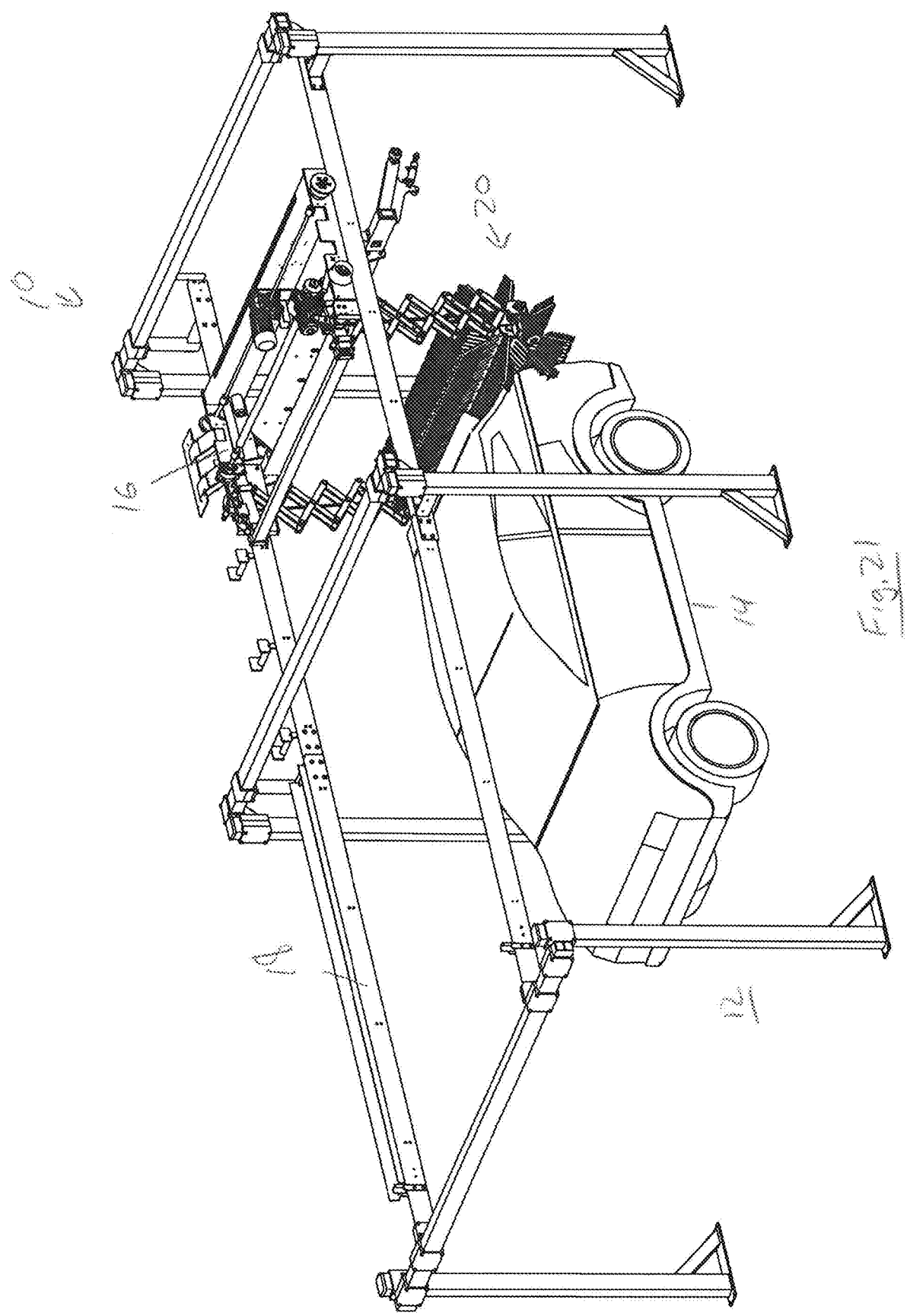
FIG. 21 illustrates a perspective view of system in the same state as FIG. 20.

FIGS. 20 and 21 illustrate a further rearward position of the top brush 20, the pivot frame member 80, and the frame 16, and the top brush 20 is extended further downward relative to the FIGS. 18 and 19. The top brush 20 and the pivot frame member 80 are pivoted in the same direction as in FIGS. 18 and 19. This position allows for further cleaning of the rear surface, and provides an improved wash.

In the above description related to FIGS. 12-21, the vehicle 14 remained stationary within the vehicle treatment area 12. However, it will be appreciated that the above described movement and pivoting of the top brush 20 relative to the vehicle body 14 may still occur even if the vehicle 14 is moving. The top brush 20 may still be controlled to be retracted and extended based on the vehicle contour and/or feedback. Moreover, even if the vehicle 14 pulls forward unexpectedly, the ability of the top brush 20 to pivot in response to a forward force on the brush 20 reduces damage and down time for the system 10.

The top brush 20 and pivot frame member 80 may pivot in a reactive manner, and they may also be actuated to pivot to a predetermined degree, if desired. The linear frame 21 was shown throughout the figures as a scissor mechanism, but it will be appreciated that other linearly extendable mechanisms may be used that may be coupled to the pivot frame member 80 or similar structure that allows for both pivoting and vertical movement to be combined and controlled to provide an improved wash over front, top, and rear surfaces, and that can be resistant to damage in the event of vehicle pull through.

The above-described top brush 20 mounted to the frame 16 is configured to travel along the rail system 18, and may also remain in a fixed position on the rail system 18 for conveyor-type wash systems in which the vehicle 14 is conveyed through the vehicle treatment area 14. A conveyor-type arrangement may also be used without the overhead rail system 18.

Figure 22:
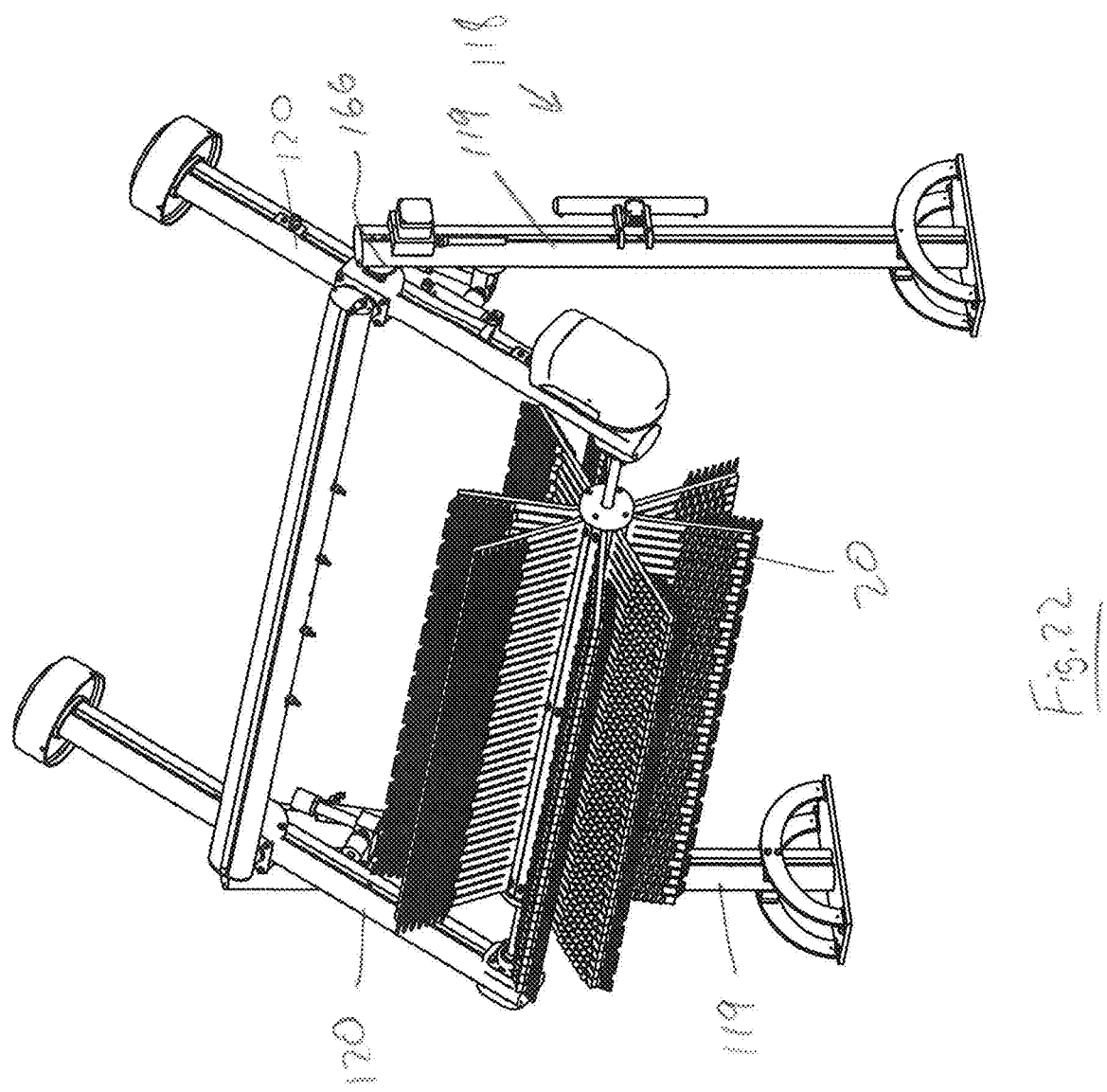
FIG. 22 illustrates another aspect of the system, with the top brush supported on ground engaging vertical rails and configured for pivoting in accordance with an aspect of the present disclosure.
Figure 23:
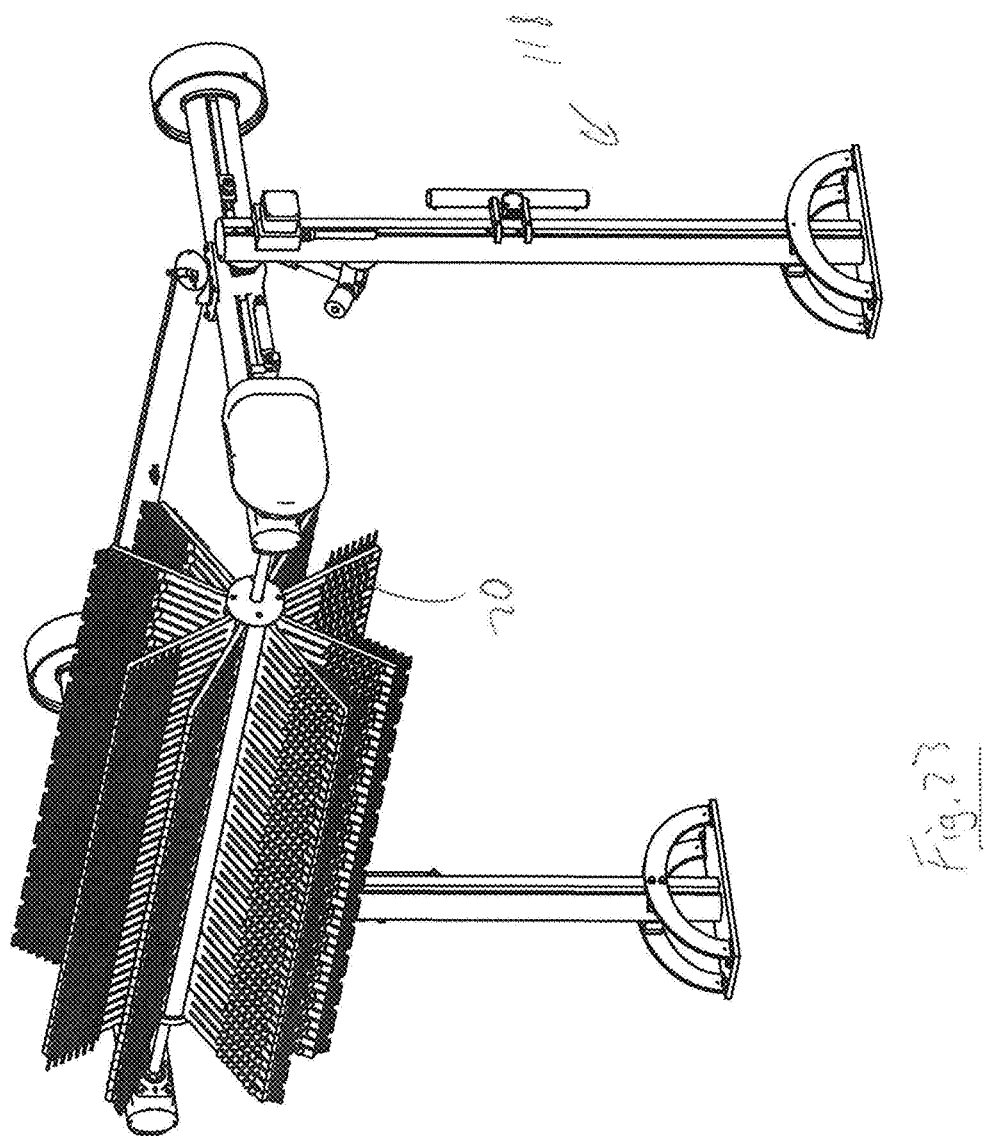
FIG. 23 illustrates the system of FIG. 22 in a further pivoted state relative to FIG. 22.
Figure 24:
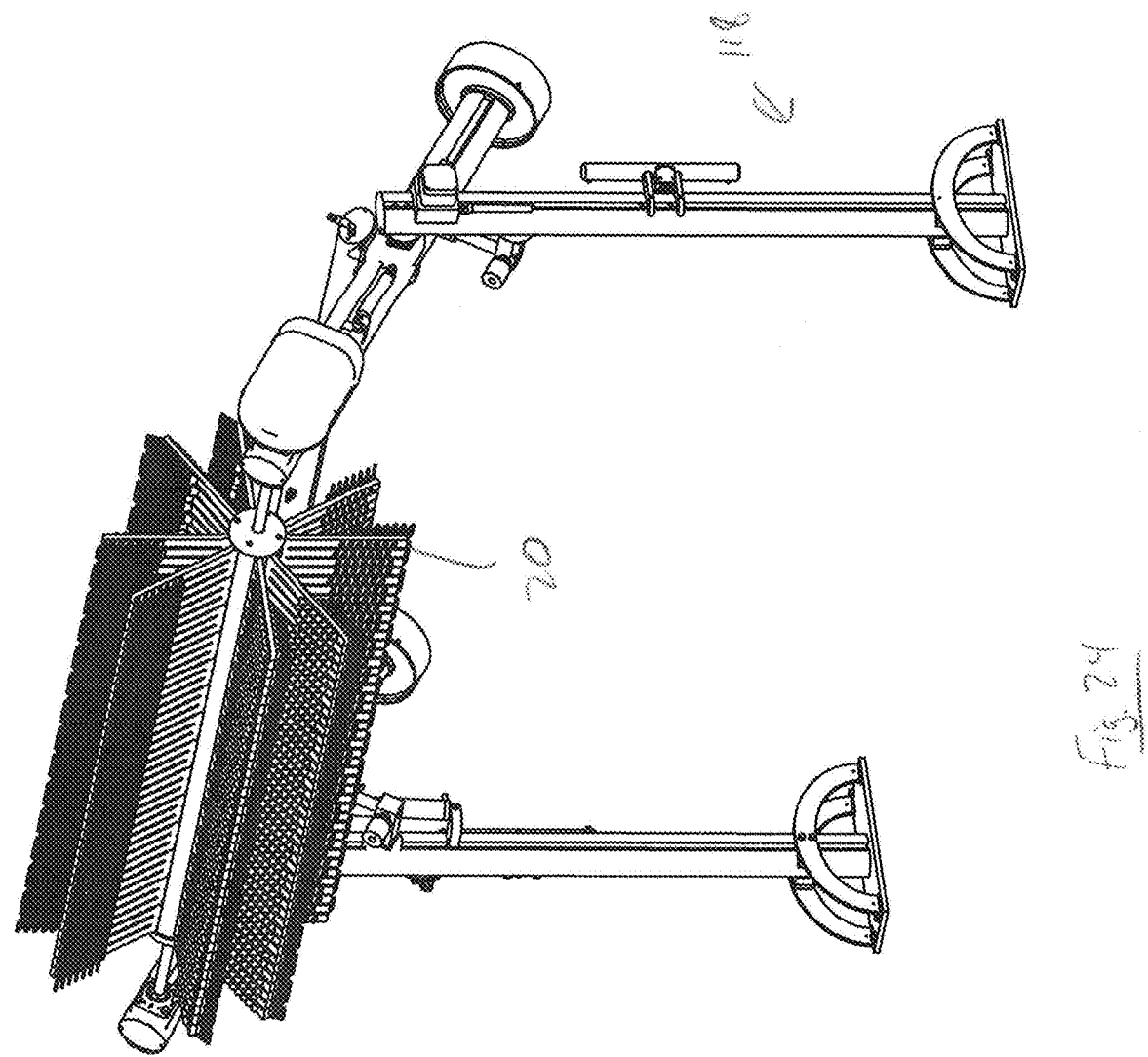
FIG. 24 illustrates the system of FIGS. 22 and 23 in yet another pivoted state relative to FIGS. 22 and 23.

With reference to FIGS. 22-24, an alternative aspect is illustrated in which the top brush 20 is configured to pivot relative to a fixed rail system 118. The fixed rail system 118 includes a pair of vertically extending legs 119. The top brush 20 is attached to a pair of pivot arms 120. The pivot arms 120 may be secured to the legs 119, and may pivot about a pivot point 166 relative to the rails 119. According to an aspect, the top brush 20 is secured for rotation to the bottom ends of the pivot rails 120. As shown in FIGS. 22-24, the pivot arms 120 can pivot about the their respective pivot point 166 to raise and lower the top brush 20 with respect to an upper surface of a vehicle.

FIG. 22 illustrates the pivot arms 120 in a first position such that the top brush 20 is in a lower position, such as for engaging a hood or trunk of a vehicle. FIG. 23 illustrates the pivot arms 120 pivoted such that the top brush 20 is in an intermediate position, such as for engaging an upper roof of a vehicle. FIG. 24 illustrates the pivot arms 120 being further pivoted to a third upper position, where the top brush 20 is higher than the second position. In this position, the top brush 20 may be removed from engagement with a vehicle exterior. According to an aspect, the pivoting of the top brush 20 via the pivot arms 120 may be accomplished in response to the vehicle 14 pulling forward or being conveyed through the rails 119 and against the top brush 20. The top brush 20 may track the contour of the vehicle 14 as it is moving past the top brush 20. According to another aspect, the movement of the pivot arms 120 can be accomplished by an actuator mechanism in combination with various feedback sensors to follow the contour of the vehicle exterior.

Unlike the prior art system previously described, the pivot arms 120 allow for the top brush 20 to move upward and pivot away as the vehicle 14 moves forward into contact with the top brush 20.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A vehicle washing system comprising:
a frame disposed above a vehicle treatment area and configured for supporting at least one vehicle treatment component;
a first brush coupled to the frame, wherein the first brush is rotatable about a central axis which axis is oriented generally parallel to the vehicle treatment area;
a vertical translation mechanism operatively coupled to the first brush, wherein the vertical translation mechanism permits movement of the first brush in a vertical direction relative to the vehicle treatment area for contacting at least an upper surface of a vehicle disposed therein; and
a pivot mechanism operatively coupled to the first brush, wherein the pivot mechanism permits pivoting movement of the first brush about a pivot point in a direction toward and away from a vehicle entrance portion;
wherein the vertical translation mechanism includes a scissor support mechanism and includes the pivot point of the pivot mechanism, and the scissor support mechanism is pivotable about the pivot point, wherein the pivot point is disposed at an upper end of the scissor support mechanism, wherein the first brush is disposed at a lower end of the scissor support mechanism, and wherein the first brush pivots about the pivot point when the scissor support mechanism pivots about the pivot point.

2. The system of claim 1, wherein the vertical translation mechanism comprises the scissor support mechanism, the scissor support mechanism extending between the frame and the first brush, wherein the scissor mechanism includes a retracted position and an extended position, wherein the first brush is disposed closer to the vehicle treatment area in the extended position relative to the retracted position.

3. The system of claim 1, wherein the vertical translation mechanism is coupled to a pivot frame, and the pivot frame includes the pivot point of the pivot mechanism.

4. The system of claim 1, wherein the vertical translation mechanism operates without a guidetrack, wherein when the vertical translation mechanism is in the retracted mechanism there are no downwardly hanging guides extending below the vertical translation mechanism.

5. The system of claim 1, wherein the frame is moveable horizontally relative to the vehicle treatment area, such that the system may operate with the vehicle in a fixed position in the vehicle treatment area.

6. The system of claim 5, wherein the frame is supported by horizontally extending rails.

7. The system of claim 1, wherein the frame is horizontally fixed relative to the vehicle treatment area, such that the system may operate with the vehicle traveling horizontally through the vehicle treatment area.

8. The system of claim 1, further comprising:
a controller having a processor configured to receive signals from the washing system regarding an operating state of the system and further configured to send signals to the brush to effect vertical translation thereof.

9. A method for treating a vehicle body in a vehicle washing system, the method comprising:
providing a vehicle having a vehicle body within a vehicle treatment area of a vehicle washing system, wherein the vehicle washing system comprises:
a frame disposed adjacent the vehicle treatment area;
a rotating brush secured to the frame and configured to contact at least an upper surface of a vehicle, the rotating first brush including a plurality of wash media elements;
a brush translation mechanism in communication with the rotating brush and configured to move the rotating brush upwardly and downwardly with respect to the vehicle treatment area between an extended position and a retracted position; and
a pivot mechanism coupling the brush translation mechanism to the frame such that the rotating brush may pivot forwardly and rearwardly in response to contact with a vehicle exterior;
wherein the pivot mechanism includes a pivot point that is vertically fixed with respect to the vehicle treatment area and the brush translation mechanism pivots about the pivot point;
moving the rotating brush in a downward vertical direction relative to the vehicle body;
pivoting the rotating brush about the pivot point disposed above the vehicle body;
moving the rotating brush in a horizontal direction relative to the vehicle body; and
moving the rotating brush in an upward vertical direction relative to the vehicle body.

10. The method of claim 9, further comprising:
detecting, with a controller, a contour of the vehicle body; and
determining a degree of downward vertical movement of the rotating brush in response to the detection of the contour of the vehicle body;
wherein the step of moving the rotating brush in a downward vertical direction is performed in response to determining the degree of downward vertical movement.

11. The method of claim 9, wherein the rotating brush is secured to the frame and remains generally horizontally fixed relative to the vehicle treatment area, and the vehicle moves horizontally along the vehicle treatment area.

12. The method of claim 9, wherein the vehicle remains horizontally fixed relative to the vehicle treatment area, and the rotating brush moves horizontally along the vehicle treatment area.

13. The method of claim 9, wherein the step of moving the rotating brush in a downward vertical direction includes extending the brush translation mechanism.

14. The method of claim 9, wherein the step of moving the rotating brush in an upward vertical direction includes retracting the brush translation mechanism.

15. The method of claim 9, wherein the step of pivoting the rotating brush includes pivoting the brush translation mechanism about the pivot point.

16. A vehicle wash system, comprising:
   a frame disposed adjacent a vehicle treatment area;
   a rotating brush secured to the frame and configured to contact at least an upper surface of a vehicle, the rotating brush including a plurality of wash media elements;
   a brush translation mechanism in communication with the rotating brush and configured to move the rotating brush upwardly and downwardly with respect to the vehicle treatment area between an extended position and a retracted position; and
   a pivot mechanism coupling the brush translation mechanism to the frame such that the rotating brush may pivot forwardly and rearwardly in response to contact with a vehicle exterior;
   wherein the pivot mechanism includes a pivot point that is vertically fixed with respect to the vehicle treatment area and the brush translation mechanism pivots about the pivot point.

17. The vehicle wash system of claim 16 wherein the brush translation mechanism comprises a scissor support mechanism that extends between the frame and the rotating brush.

18. The vehicle wash system of claim 16, wherein the frame is stationary with respect to the vehicle treatment area.

19. The vehicle wash system of claim 16, wherein the frame moves with respect to a vehicle disposed in the vehicle treatment area.

20. The vehicle wash system of claim 16, further comprising:
   a controller having a processor configured to receive signals from the washing system regarding an operating state of the system and further configured to send signals to the brush to effect vertical translation thereof.

* * * * *